US011941662B2

(12) United States Patent
Zimmerman

(10) Patent No.: US 11,941,662 B2
(45) Date of Patent: *Mar. 26, 2024

(54) DYNAMIC GENERATION AND ORGANIZATION OF DIGITAL CIRCULARS

(71) Applicant: Design House, Inc., Solon, OH (US)

(72) Inventor: Adam Zimmerman, Solon, OH (US)

(73) Assignee: Design House, Inc., Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,325

(22) Filed: Feb. 27, 2023

(65) Prior Publication Data

US 2023/0222545 A1      Jul. 13, 2023

Related U.S. Application Data

(63) Continuation of application No. 18/152,859, filed on Jan. 11, 2023.

(Continued)

(51) Int. Cl.
*G06Q 30/0251* (2023.01)
*G06F 3/0482* (2013.01)
(Continued)

(52) U.S. Cl.
CPC ....... *G06Q 30/0255* (2013.01); *G06F 3/0482* (2013.01); *G06F 3/14* (2013.01);
(Continued)

(58) Field of Classification Search
CPC combination set(s) only.
See application file for complete search history.

(56) References Cited

U.S. PATENT DOCUMENTS 9,092,806 B2   7/2015 Charlebois et al.
9,159,087 B2   10/2015 Cheung et al.
(Continued)

FOREIGN PATENT DOCUMENTS

WO   WO-2005076167 A1 *  8/2005   ......... G06Q 30/0603

OTHER PUBLICATIONS

International Search Report; International Searching Authority; International Application No. PCT/US2023/060443; dated May 1, 2023; 2 pages.

(Continued)

*Primary Examiner* — Marie P Brady
(74) *Attorney, Agent, or Firm* — Taft Stettinius & Hollister LLP

(57) ABSTRACT

A dynamic digital advertising content system having a front end system and a back end system, and used to present product content to a user's computing device in the form of a digital circular. The back end system provides retailers and third party access to upload, and update, product content information for the digital circular, including videos and animations. The dynamic digital advertising content system can include integrations for third-parties such as digital coupon providers and loyalty program providers. The system permits users the ability to share with other users merchandise displayed in the digital circular and/or selected for a shopping list. Such shared content can be dynamically arranged for subsequent presentation on a computing device of the recipient. The digital circular is further customizable for individual retailers or retailer locations, as well as customizable based on detected histories and/or characteristics of the user receiving the digital circular.

20 Claims, 7 Drawing Sheets

Related U.S. Application Data

(60) Provisional application No. 63/301,278, filed on Jan. 20, 2022, provisional application No. 63/266,709, filed on Jan. 12, 2022.

(51) Int. Cl.
  *G06F 3/14* (2006.01)
  *G06Q 30/0241* (2023.01)

(52) U.S. Cl.
  CPC ..... *G06Q 30/0257* (2013.01); *G06Q 30/0276* (2013.01); *G06Q 30/0277* (2013.01)

(56) References Cited

U.S. PATENT DOCUMENTS

| | | |
|---|---|---|
| 9,424,813 B2 | 8/2016 | Cheung et al. |
| 9,589,272 B2 | 3/2017 | Cheung et al. |
| 9,836,866 B2 | 12/2017 | Cheung et al. |
| 9,842,378 B2 | 12/2017 | Charlebois et al. |
| 10,360,712 B2 | 7/2019 | Cheung et al. |
| 10,599,291 B2 | 3/2020 | Cheung et al. |
| 10,699,306 B2 | 6/2020 | Cheung et al. |
| 10,942,628 B2 | 3/2021 | Cheung et al. |
| 11,010,718 B2 | 5/2021 | Cheung et al. |
| 2003/0028451 A1* | 2/2003 | Ananian ............ G06Q 30/0615 705/26.42 |
| 2008/0109327 A1* | 5/2008 | Mayle ................ G06Q 30/0603 705/27.1 |
| 2011/0251897 A1* | 10/2011 | Litvack .............. G06Q 30/0275 705/14.58 |
| 2013/0044113 A1* | 2/2013 | Cheung ................... G06F 16/35 345/441 |
| 2014/0052580 A1* | 2/2014 | Ali .......................... G06F 3/016 705/26.7 |
| 2014/0089092 A1* | 3/2014 | Kilmer ............... G06Q 30/0269 705/14.58 |
| 2015/0134457 A1* | 5/2015 | Cheung .............. G06Q 30/0251 705/14.64 |
| 2017/0185251 A1* | 6/2017 | Jain ...................... G06F 3/0481 |
| 2017/0372400 A9 | 12/2017 | Levy et al. |
| 2022/0222728 A1* | 7/2022 | Gupta ................ G06Q 30/0201 |
| 2022/0377424 A1* | 11/2022 | Deng ................. G06Q 30/0282 |

OTHER PUBLICATIONS

Written Opinion of the International Searching Authority; International Searching Authority; International Application No. PCT/US2023/060443; dated May 1, 2023; 8 pages.

\* cited by examiner

|  | Category | Price | Start Date | End Date | Artwork | Card/Grid Size | Hidden |
|---|---|---|---|---|---|---|---|
| Product #1 | Meat | $5.50/lb | 04/01/2023 | 04/08/2023 | Image | 2x3 | |
| Product #2 | Candy | $4.50 | 04/02/2023 | 04/12/2023 | Video | 1x1 | X |
| Product #3 | Meat | $3.33/lb | 04/03/2023 | 04/06/2023 | Animation | 3x1 | |
| Product #4 | Dairy | $3.99 | 04/01/2023 | 05/06/2023 | Image | 2x1 | |

FIG. 2

DYNAMIC GENERATION AND ORGANIZATION OF DIGITAL CIRCULARS

CROSS-REFERENCE TO RELATED APPLICATIONS

This is a continuation of U.S. Nonprovisional patent application Ser. No. 18/152,859, filed on Jan. 11, 2023 which claims the benefit of U.S. Provisional Patent Application No. 63/266,709, filed on Jan. 12, 2022, and U.S. Provisional Patent Application No. 63/301,278, filed on Jan. 20, 2022, each of which are incorporated herein by reference in their entirety.

TECHNICAL FIELD

The present disclosure generally relates to consumer engagement materials, and more particularly, but not exclusively, to the dynamic generation and organization of location specific customizable digital circular content.

BACKGROUND

Traditionally, a variety of venues have been utilized to entice, or otherwise facilitate, consumer purchase of product offerings. For example, at least certain entities involved in the sale of consumer products have utilized print, radio, television, internet, and/or cable to communicate to consumers product sales and discounts, among other product related promotions. Certain businesses or organizations have promoted product offerings via printed publications in the form of weekly circulars that can be, for example, bundled with newspapers and delivered to consumers' residences and/or made available at the entrance to an associated entity or franchise of the business or organization. An electronic version of such circulars can also be provided in a portable document format (e.g., .pdf file format). Such .pdf file format circulars can be distributed through internet channels for viewing on a personal computing device, which can include, for example, a mobile or portable hand held computing device.

The provision of digital circulars can permit positive engagement between customers and retailers, and thus remains an area of interest. However, the .pdf file format of current digital circulars can be limiting, particularly with respect to customization in terms of both the presentation and arrangement of product offerings from retailers. Further, such digital circulars are limited and/or incapable, of responding, let alone adapting, to specific direct interaction by consumer engagement with the digital circular via the personal computing device. Further, when viewing such digital circulars on at least mobile and portable personal computing devices, such limitations also often include a need to relatively continuously zoom and/or pan in on at least portions of digital circular so as to clearly view a limited portion of the circular. Existing systems therefore have various shortcomings relative to certain applications. Accordingly, there remains a need for further contributions in this area of technology.

SUMMARY

Embodiments of the present disclosure relate to a system that displays a digital circular to a user based on spatial positioning and dynamic content dynamically selected to visually organize and display a plurality of circular content items included in the digital circular. The system includes at least one processor, and a memory coupled with the processor. The memory including instructions that when executed by the processor cause the processor to receive from an end user a selection of a digital circular location. The digital circular location is associated with a retail location that the end user requests to view the digital circular based on a current time frame that the user executes the selection of the digital circular location. The processor is configured to request the digital circular that includes a plurality of item cards created based on a plurality of item card parameters that are customized to the digital circular location and current time of the selected digital circular location from a digital circular generation system based on the digital circular location. The item card parameters are indicative to a presentation of each item card as displayed in the digital circular and are customized to a retailer priority of a digital circular retailer associated with the digital circular location to advertise to the user and to a purchase priority of the user to purchase retail items from the digital circular retailer. The processor is configured to receive the digital circular that includes the plurality of item cards from the digital circular generation system that are spatially positioned into a corresponding item card partition of a digital circular grid for the digital circular. The processor is further configured to instruct a display to dynamically display each item card in an item card position and an item card size associated with each item card partition to prioritize the display of each item card in the digital circular based on the item card parameters. Each item card is dynamically formatted with item card content to dynamically display each item card with the item card content as spatially positioned in the digital circular grid to prioritize the display of the item card content based on the item card parameters. The processor is further configured to instruct the display to dynamically adjust the display to display updates to the digital circular grid based on updates to the item card content. The spatial position of each item card as displayed by the display is dynamically adjusted as the item card parameters associated with each item card are updated.

In an embodiment, a method may be implemented for displaying a digital circular to a user based on spatial positioning and dynamic content dynamically selected to visually organize and display a plurality of circular content items included in the digital circular. The method may include receiving from an end user a selection of a digital circular location. The digital circular location is associated with a retail location that the end user requests to view the digital circular based on a current time frame that the user executes the selection of the digital circular location. The method may further include requesting the digital circular that includes a plurality of item cards created based on a plurality of item card parameters that are customized to the digital circular location and current time of the selected digital circular location from a digital circular generation system based on the digital circular location. The item card parameters are indicative to a presentation of each item card as displayed in the digital circular and are customized to a retailer priority of a digital circular retailer associated with the digital circular location to advertise to the user and to a purchase priority of the user to purchase retail items from the digital circular retailer. The method may further include receiving the digital circular that includes the plurality of item cards from the digital circular generation system that are spatially positioned into a corresponding item card partition of a digital circular grid for the digital circular. The method may further include instructing a display to dynamically display each item card in an item card position and an item card size associated with each item card partition to prioritize the display of each item card in the digital circular based on the item card parameters. Each item card is dynamically formatted with item card content to dynamically display each item card with the item card content as spatially positioned in the digital circular grid to prioritize the display of the item card content based on the item card parameters. The method may further include instructing the display to dynamically adjust the display to display updates to the digital circular grid based on updates to the item card content. The spatial position of each item card as displayed by the display is dynamically adjusted as the item card parameters associated with each item card are updated.

Another embodiment of the present disclosure is a unique dynamic digital advertising content system. Other embodiments include apparatuses, systems, devices, hardware, methods, and combinations for quick assembly of print circulars and/or dynamically viewing the same. Further embodiments, forms, features, aspects, benefits, and advantages of the present application shall become apparent from the description and figures provided herewith.

BRIEF DESCRIPTION OF THE FIGURES

FIG. 2 illustrates an exemplary table containing product content and digital circular display information for the associated products that can be maintained at a back end system of the DDACS.

DETAILED DESCRIPTION OF THE ILLUSTRATIVE EMBODIMENTS

Figure 1:
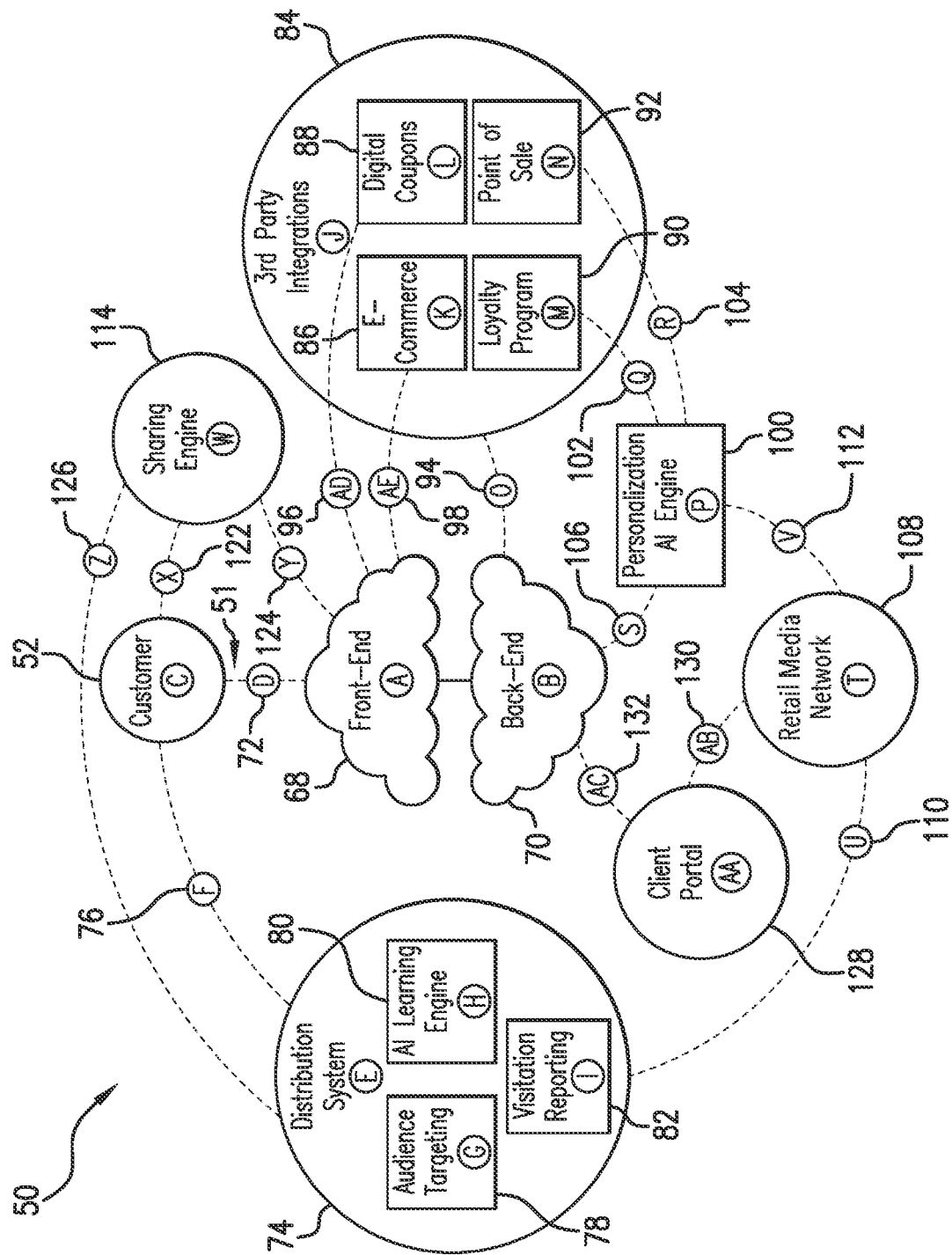
FIG. 1 illustrates aspects of an embodiment of a dynamic digital advertising content system (DDACS).

Embodiments of the disclosure generally relate to enabling a user of a digital circular (e.g. a customer of a retailer or customer of a competitive retailer) to view the digital circular generated at least in part based on information stored in a back end system 70 system. The digital circular in one form is based on spatial positioning and dynamic content dynamically selected to visually organize and display a plurality of circular content items included in the digital circular. In an example embodiment, the digital circular is displayed on a system having at least one processor and a memory coupled with the processor, the memory including instructions that cause the processor to receive the digital circular based on a user a selection of a digital circular location. Such a system capable of displaying digital circulars according to location permit a retailer to customize the circular for that particular location in lieu of creating a regional and/or national wide circular which may not reflect consumer products which are only locally available to the user. A back end system 70 system complements the front end system 68 system and likewise includes at least one processor and a memory coupled with the processor, the memory including instructions that cause the processor to process content related to the digital circular based on the selection of the user of the digital circular location. Content capable of being processed on the back end system 70 can be uploaded by a client (e.g. a retailer) and/or retrieved and/or formed by the back end system 70 based upon a client request. The content can relate to the products to be displayed by the front end system 68 and associated content.

Various functions of and interactions between the front end system 68 and the back end system 70 are contemplated, including those related to various other entities/engines/networks. To set forth just a few non-limiting examples, third-party providers of services such as loyalty programs can interact with the back end system 70 to facilitate tracking and possible redemption of loyalty points with respect to purchases by the user. In some embodiments the various entities/engines/networks can exist separate from the front end system 68 and/or back end system 70, but in some forms can be integrated therewith. Continuing with a few other examples, the back end system 70 can include a portal through which a client (e.g. a retailer) uploads configuration information used by the back end system 70 to determine the layout of the digital circular. The back end system 70 can also include and/or be integrated with a personalization AI engine useful to ingest purchase history of a user to provide a customized digital circular. Various other entities/engines/networks are described in greater detail further below.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

FIG. 1 illustrates aspects of an embodiment of a dynamic digital advertising content system or digital circular generation system ("DDACS") 50, including a relationship between a user 52 and a retailer/client. The user 52 can be any person, user, organization, and/or entity, among others, that may be interested in perusing and/or purchasing products, goods, and/or services (collectively referred to herein as "product" or "products") that are offered by, and/or through, the retailer/client. The retailer/client can be a person, organization, entity, business, seller, merchant, store, store chain, and/or franchise, among other entities, that is/are offering a product(s) for sale. As used herein, the term "retailer" or "client" can be used interchangeably as the terms can refer to a business or other organization engaged in the business of promoting and/or selling the product(s) to the user 52. As also discussed below, the DDACS 50 can also be operable to accommodate communications and engagement with/by third party participants other than the user 52 and retailer, including, for example, third party participants such as digital coupon providers and/or loyalty program providers, among others.

The DDACS 50 is adapted to accommodate generation of a digital circular that is customizable at least at an individual store, franchisee, and/or retailer specific level, as well as also be customizable among groups within an entity or organization and/or the entire entity or organization. As discussed below, the DDACS 50 can be dynamic in at least terms of the arrangement and/or presentation of information, including product content, in the digital circular in response to retailer and/or user 52 decisions and/or selections. Such engagement with the DDACS 50 by a user 52, retailer, and/or third party, including via the inputting of information and/or responses in/to the DDACS 50, can occur in via use of a digital advertising content communications device, including via use of user interfaces provide by, or communicatively coupled to, digital advertising content communications devices. Moreover, a retailer, consumer 52, and/or third party can be able to engage with the DDACS 50 via use of a variety of different types of digital advertising content communications devices, including personal computing devices, such as a desktop computer, laptop, tablet, smart phone, and/or mobile or cellular device, among other computing devices.

According to certain embodiments, the DDACS 50 includes at least a front end system 68 and a back end system 70. The front end system 68 can include instructions for the display of product content and/or retailer information, among other information, on a user interface of a computing device. Moreover, as discussed below in more detail, the front end system 68 can be utilized to generate and/or transmit information in the form of a digital circular for presentation on the computing device of the user 52, and/or for engagement with the user 52. For example, according to certain embodiments, the front end system 68, or the back end system 70, can generate a digital circular in which information regarding products, also referred to as product content, among other information, can be arranged and/or presented for display on the personal computing device of the user 52. Additionally, the front end system 68 can receive inputs, such as, for example, selections, made by the user 52 via a user interface or input device of the personal computing device, including, for example, via a touch screen, keypad, and/or mouse, among others. According to certain embodiments, the front end system 68 is, or includes, a graphical user interface of a website that permits interaction by a user 52 with content published by the retailer via the DDACS 50.

In at least some instances, communications between the user 52, and moreover a computing device of the user 52, and the front end system 68 can occur via a channel 72. According to certain embodiments, the channel 72 can accommodate information from the front end system 68 being provided to the user 52 in the form of an on-line content, such as, for example, in the form of a website and/or software application ("app.") that is accessible by the consumer 52, and which permits consumer interaction with content published by the retailer through the DDACS 50. As will be appreciated, the website utilized with/for the channel 72 can be rendered either on the front end system 68 or back end system 70, and in some forms can use isomorphic rendering with a render on the back end system 70 first and on the front end system 68 thereafter.

The channel 72 can be configured to accommodate communication between a computing device of a user 52 and the front end system 68 using any suitable type of wired and/or wireless connection, as well as via any suitable type of communication protocol, telecommunications hardware, and associated software. Thus, the connection 72 can be, but is not limited to, an internet enabled communication, a wireless connection (e.g., Wi-Fi, Bluetooth and, cellular, etc.), or a wireline connection (e.g., utilizes infrastructure delivering telecommunications to residences and or buildings). In short, any suitable digital medium through which a computing device of the user 52 can interact with the front end system 68 and view content related to the digital circulars described herein is contemplated. The computing devices of users 52 may also interact with the DDACS 50 via through a retailer's native software application, a downloaded Progressive Web App (PWA), or via a retailer's website, including, but not limited to, a webpage or link to the DDACS 50 that is embedded directly on the retailer's website.

The back end system 70 can generally be configured to accommodate input and/or content from a specific, or individual, retailer with respect to at least products or services that can be presented in the digital circular. According to certain embodiments, the back end system 70 is a web-based software platform that can provide content management access for retailer websites, including, for example, content management can be performed by the retailer(s) and/or third parties. Further, the back end system 70 can be utilized for prioritizing the products that are to be presented in the digital circular, and/or the timing or duration at which specific products can be presented in the digital circular, among other features. According to certain embodiments, a client portal 128 can be provided that provides retailers access to the back end system 70 via a channel 132. Such a portal 128 can, for example, be a web-based software platform that is accessible to a retailer or other operator via a computing device.

The connection 132 between the client portal 128 and the back end system 70 can provide direct control over content management within the back end system 70. Thus, each retailer can have retailer specific credentials that can allow the retailer to at least access the back end system 70, and which may be utilized to access other features of the system 50, including the below discussed retail media network 108. Accordingly, access to the back end system 70 via the client portal 128 can also involve satisfaction of certain security measures, such as, for example, a password and/or two factor authentication. Additionally, permissions can be enabled to provide users of the back end system 70 control over different areas of the associated website for that particular retailer, including control over portions of the website that may be accessible to customers 52 via the front end system 68.

Retailers can, via the client portal 128 and associated channel 132, provide or otherwise input a variety of information regarding a plurality of products to the back end system 70. Thus, for example, according to certain embodiments, the back end system 70 can comprise a database, data store, or other storage means. The manner in which product information can be provided, stored, edited, and/or removed by a retailer to/from the back end system 70 can vary. For example, according to certain embodiments, the back end system 70 can maintain a listing, such as, for example, a spreadsheet or table, among other manners of recording information regarding products. It will be appreciated that other types of data encapsulation and transfer to the back end system 70 are contemplated, such as, but not limited to serialization of the data and transfer via API calls. Additionally, or alternatively, individual retailers can, via use of the client portal 128, upload information to the back end system 70, such as, for example, upload a spreadsheet file containing text and artwork, among other product content, for one or more products. Further, data can be uploaded to the back end system 70 in a variety of other, or additional, manners, including, but not limited to, via a dynamic connection between the back end system 70 and one or more databases of the retailer(s), including, but not limited to, back office software, point of sales, and/or e-commerce systems, among other measures of data storage, as well as combinations thereof. Such a configuration can accommodate an uploading of relatively large amounts of information by the retailer to the back end system 70. Further, in addition to, or in lieu of, individual stores uploading information, the back end system 70 can also include nodes that can accommodate an uploading of product content that can be shared by different retailers, including, for example, shared by different branches or franchisees that may be related to a common parent organization or entity. In some embodiments the back end system 70 can be configured to create store groups which are useful to create efficiency in content management. The store groups can provide nodes where content can be uploaded for stores that share like content.

Accordingly, the back end system 70 can be utilized to archive and organize data related to a digital circular, including, for example, information related to product, value/pricing, promotional start and stop dates, among other data.

A non-limiting example of information that can be provided or uploaded to the back end system 70 is shown by the exemplary spreadsheet or table 20 shown in FIG. 2. While FIG. 2 illustrates an exemplary use of a spreadsheet 20, as discussed above, information can be provided to the back end system 70 in a variety of other manners, including, but not limited to, via a dynamic connection. As seen by the exemplary spreadsheet or table 20 depicted in FIG. 2, according to such embodiment, such a spreadsheet 20 can include either rows or columns that correspond to a product(s), and the other of the rows or columns can relate to characteristics, features, and/or sales for the products. For example, referencing the example shown in FIG. 2, according to certain embodiments, each row in the spreadsheet 20 can correspond to a different product (e.g. Product #1, Product #2, etc.), and the columns of the spreadsheet 20 can correspond to features or characteristics relating to the product and/or the sale of the product. Thus, in such an example, for each product, there may be one or product descriptor categories 22, one or more product sales categories 24, and/or one or more product display categories 26.

Product descriptor categories 22 can include, but are not limited to, an indication of a category to which the product can be grouped (e.g. meat, candy, dairy, cleaning supply, pastry, beverage, etc.), brand name, manufacturer, product size, and/or product quantities, among other characteristics or features of the product. With respect to at least the category to which the product can be grouped, group options available for selection when entering a particular product into the table can be predetermined The one or more product sales categories 24 can include, for example, the sale price of the product, product discount or rebate information, and start and end dates for a sale of the product is to be available for display on the circular that is to be generated by the DDACS 50.

The one or more product display categories 26 can include an indication, or location, of the artwork that is to be used, if any, for the particular product in the circular, a size in a digital circular grid for the digital circular that the information regarding the product including artwork, is to occupy in a digital circular grid for the digital circular, and whether the product is to be hidden with at least a first level of the circular. According to certain embodiments, the product display categories 26 can also include dates and/or time durations that the particular product is to be, or can be, displayed in the circular. The artwork for each product can correspond to a static image, animation, and/or video that can be stored by the back end system 70 and/or accessible or retrievable from a third party service. Examples of animations can include a looping animation. Animations shown for associated products in the digital circular can play automatically when the user 52 scrolls to a locations about the digital circular at which the product is shown in the display of the user computing device. It will be appreciated that animations can included not only moving images, but also relevant product details such as product name and/or price, among other information. In some forms the animation may run in the background while relevant product details remain in the foreground. To enable the animation, a user such as the retailer can upload the animation to the back end system 70, or the back end system 70 can be configured to extract a looped animation from a larger video. For example, according to certain embodiments, the artwork can correspond to a link to a video that is accessible via use of the YouTube™ Data application programming interface (API).

Additionally, as discussed below, the information from one or more of the product descriptor categories 22, product sales categories 24, and/or product display categories 26, as well as information provided by those categories 22, 24, 26 can be utilized to prioritize which product content is to be displayed in the digital circular, and/or assist in the ordering and positioning of content for different products in a digital circular grid of the digital circular.

Figure 4:
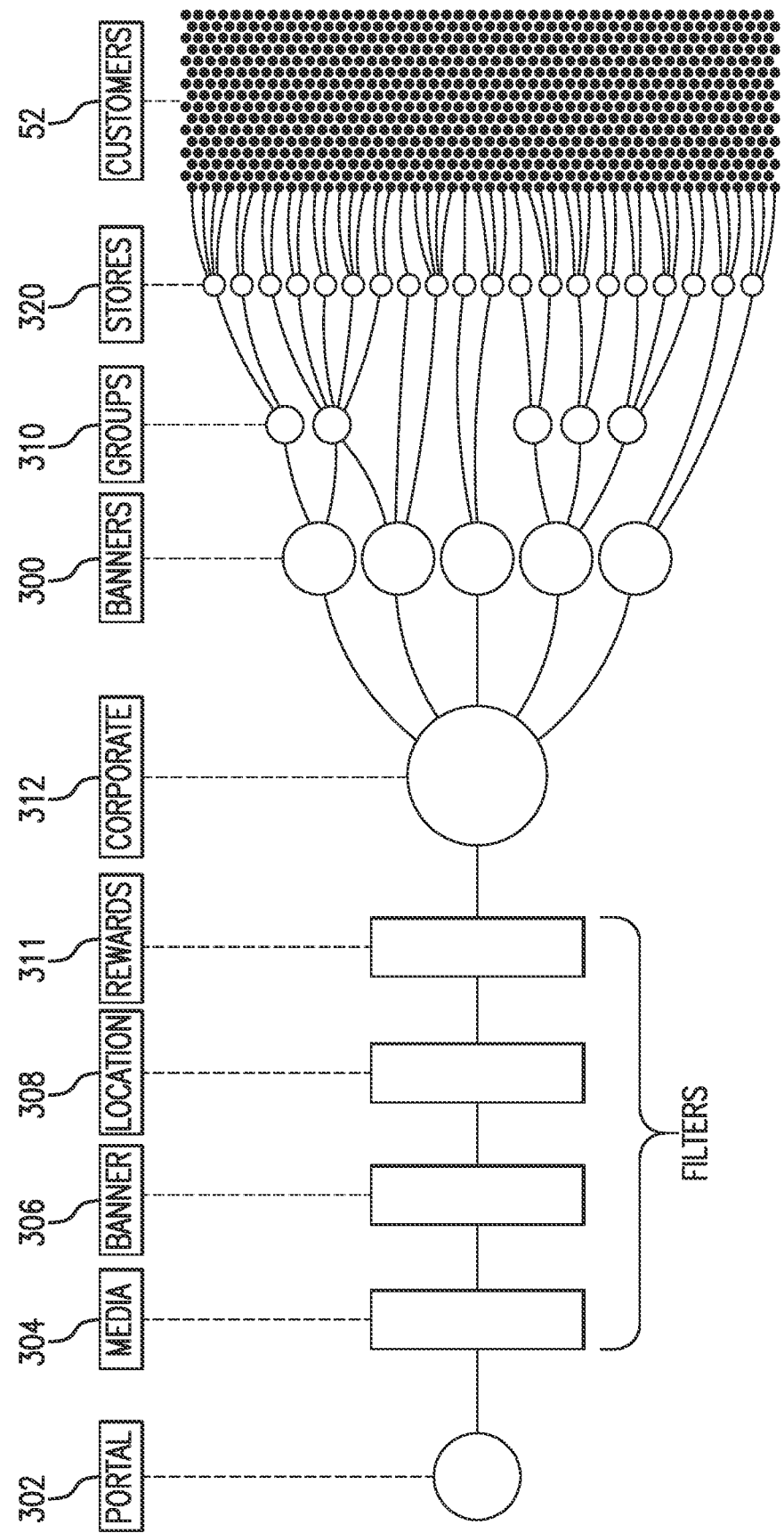
FIG. 4 illustrates an embodiment of a retail media network.

Referencing FIGS. 1 and 4, according to certain embodiments, the DDACS 50 can also include a retail media network 108. The retail media network 108 can be configured to assist retailers with connecting advertising partners with placement in the front end system 68, including with respect to placement in the digital circular, and/or targeted digital media campaigns. Moreover, the retail medial network 108 can provide a web-based portal 302, as seen in FIG. 4 that can be directly accessed by retailers, agents that represent retailers, or advertising partners, so that those entities can initiate a media buy within the front end system 68 and/or in a distribution system 74. The web-based portal 302 of the retail media network 108 can also be used to communicate the details of the product content that such entities would like to publish, as well as be used to upload related artwork that may be utilized by the back end system 70. According to certain embodiments, the client portal can be connected to the retail media network 108 via a connection 130 that can enable retailers access to the retail media network 108 using their client portal credentials. Retailers may have third parties manage their advertising partners content and provide access by creating a new user in their Client Portal.

The retail media network 108 can also utilize media filters 304, which can include personality profiles of potential users within the media space, and in particular in the digital circular, to target an audience based on input by advertising partners. In some embodiments the retail media network 108 can also utilize banner filters 306 to focus media campaigns and/or content management to specific banner(s) 300 within a retailer's purview. In addition, in some embodiments the retail media network 108 can utilize location filters 308 to focus media campaign and/or content management to a store or set of stores based on location. Additionally, in some forms the retail media network 108 can utilize reward filters 311 in which personality profiles based on rewards (loyalty) program purchase history is utilized to target an audience based on input by advertising partners.

Additionally, as also seen in FIG. 4, to aid in at least efficient management of digital content that can received by the back end system 70, and/or published by the front end system 68, the retail media network 108 can be organized by groups 310. Such groups 310 can correspond to a collection of stores 320 that may part of a larger organization 312, and which serve and/or have at least digital interactions with customers 52. Moreover, according to certain embodiments, the stores 320 in FIG. 4 can represent individual websites of individual retailers, including, for example, a unique websites for each retailer. According to such embodiments, the customers 52 shown in FIG. 4 can represent all views or viewers of the "stores", or the retailer websites.

The distribution system 74 can be configured to drive user 52, or virtual traffic, to the on-line content provided by the front end system 68, and more specifically, to the website(s) associated with individual retailer(s). The distribution system 74 can be adapted to utilize a variety of different tactics or approaches to drive customers to such on-line content, including, for example, via targeted medial buys. For example, the distribution system 74 can place ads in certain, or targeted, software applications or websites. In response to consumer 52 interaction with such ads, such as via user engagement with the user interface of a computing device, the consumer 52 can be taken to the retailer specific website, and, moreover, the website that for a specific, individual retailer or store.

The distribution system 74 can also be configured to interact with the consumer 52 via an information pipeline 76. For example, users 52 can interact with the distribution system 74 by engaging with certain types of online content, such as, for example, interacting with on-line advertising that may be in the form of web sites, results from an on-line search, connected home devices, and/or software applications, among other online content. For example, while engaging with the distribution system 74 the user 52 may see and engage with an advertisement from/for a retailer, at which point the user 52 is driven through channel 72 to connect with the front end system 68.

According to certain embodiments, the distribution system 74 can also be configured to have an audience targeting system 78. The audience targeting system 78 can be adapted to selectively direct particular product information, including advertisements, to a user 52 based on, or using, information that has been obtained for that particular user 52, and which may be stored, for example, in a database of the distribution system 74 and/or the audience targeting system 78, among other databases of the DDACS 50, For example, the audience targeting system 78 can be adapted to utilized at least location information, such as, global positioning system (GPS) information from a computing device, including mobile devices, of the user, to identify the proximity of the user 52 to specific retailers. Such proximity information can be utilized to determine the retailer website to which the user 52 is to be directed. Further, target audiences can be built using the audience targeting system 78 at a given moment in time, and/or across a time span, using one or more different measures including, or, alternatively, other than, location information for the user 52, such as, for example, online search history(ies) and credit card usage data, among other information.

The distribution system 74 can also be configured to include a visitation reporting system 82. The visitation reporting system 82 can be configured to monitor, and/or record within a database of the visitation reporting system 82, information regarding interaction of users 52 with targeted digital media ads of a particular retailer, and moreover, a website for that particular, or individual, retailer. The visitation reporting system 82 can be further adapted to detect, such as, for example, via location tracking of a computing device of the user 52, a subsequent physical presence of the user 52 at that particular retailer, such as, for example, at a brick-and-mortar retail location of that particular retailer. Information regarding the monitoring of user interaction with a particular retailer's website, and subsequent detection of the physical presence of the user 52 at the retailer, as indicated through the location of a computing device of the user 52 at the retailer, can be recorded in as a visitation report in a database of the visitation reporting system 82, among other portions of the of the distribution system 74 and/or DDACS 50.

Data from such visitation reporting can be used for a variety of purposes and/or different types of reports. For example, such visitation reporting can permit the distribution system 74 to produce a location specific store visitation quantity, such as, for example, a total number of visits, total number of visits per user 52, and/or histograms of store visitations by hour of day, among other reporting. Information regarding visitations that is stored by the visitation reporting system 82 can also be used to determine a value associated with such the visitations. For example, according to certain embodiments, the number of user visitations for customers that interacted with the retailer's website, as provided by the DDACS 50, can be compared with associated advertising costs incurred by the retailer to derive a cost per user visit report(s) for the retailer. Such reports can, for example, provide information regarding costs per visits during certain selected time periods. Additionally, such information can also provide a variety of other customer analytics, such as, for example, the percentage of users 52 who interact the retailer's website that then visited the retailer's location that were new, repeat, and/or relatively long term absentee customers in terms of either, or both, visiting the website and/or physically coming to the retailer's physical store or location.

The distribution system 74 can also include an artificial intelligence (AI) engine 80. According to certain embodiments, the AI engine 80 is a neural network that can utilize recorded and/or stored information to improve the accuracy in identifying potential users 52 and/or target audiences that may be responsive to information outputted by the distribution system 74, as well as outputted from other portions of the DDACS 50. Moreover, improving the accuracy in identifying users 52 to which particular types of different content, including content in the form of digital circulars, from the distribution system 74 and/or DDACS 50 is to be directed can improve the efficiency of the distribution system 74. Further, over time, as data relating to the users 52 is accumulated by at least portions of the distribution system 74, including, by the audience targeting system 78 and/or the visitation reporting system 82, among other portions of the DDACS 50, the neural network of the AI engine 80 can further refine the effectiveness in the operation of the distribution system 74. Such improvements in refining the identification of target users 52 or audiences via use of a neural network of the AI learning engine 80 can result in an improvement in the efficiency of at least the distribution system 74, including, for example, with respect to reducing the cost per user visit (as discussed above with respect to visitation reporting), improve click through rates (CTR), as well as improving other key performance indicators (KPI).

According to certain embodiments, the accumulated, or inputted, data or information from at least the audience targeting system 78 and/or the visitation reporting system 82 can be used by the AI engine 80, and, moreover, the neural network that is provided by the AI engine 80, in connection with training and/or for machine based learning of the neural network. For example, historical information regarding past behaviors, responses, and/or actions/inactions of users 52 when engaging/not engaging content provided via the distribution system 74, among other portions of the DDACS 50, can be used by the neural network of the AI engine 80 in connection with a pattern analysis, as well as refinement of identified patterns. Such analysis can assist the neural network of the AI engine 80 in developing and/or refining a model that can provide a prediction of characteristics of users 52 that may, or may not, be responsive to particular types of content presented by the distribution system 74 and/or DDACS 50. Such information can thereby assist in identifying particular users 52, or users 52 having particular characteristics, to which to target, and/or those users 52 to not target, with particular content. According to certain embodiments, the neural network of the AI engine 80 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

The DDACS 50, and, more specifically, the front end system 68, can also include a sharing engine 114 that can be communicatively coupled to the distribution system 74 via a connection 126, as well as communicatively coupled to the computing device of a user 52 via a connection 122. According to certain embodiments, connections with the sharing engine 114 can be made using a tool built into a browser or software application ("app.") that enables a special hyperlink to be sent. Such special hyperlink can be sent in a variety of manners, including in a text message, an email, or copied by the user and pasted elsewhere. Further, as represented by the connection 124 shown in FIG. 1, according to certain embodiments, the sharing engine 114 can be built directly into a user interface that is displayed on the computing device of the user, thereby providing users with relatively easy access to sharing functionality.

The sharing engine 114 can be configured to permit a user 52 to share content, such as, for example, content from or corresponding to a digital circular, and in the form of a hyperlink, with another user(s) 52. The hyperlink can correspond to information provided by, or in, a digital circular. Further, such sharing of content can occur using a variety of different types of electronic communication, including, for example, via a text message and/or email, among other forms of electronic communication. As further discussed below in connection with FIGS. 5 and 6, if a user choses to share content with one or more other users 52, the shared hyperlink can contain special codes that can trigger a rearrangement of the visual depicting of the content on the computing device of the share recipient.

As also illustrated in FIG. 1, according to certain embodiments, the DDACS 50 can further include a third party integration system 84. The third party integration system 84 can be adapted to provide an access point for third parties to access the DDACS 50. As discussed below, such access by third parties can, for example, reduce the burden on retailers by allowing third parties to supply and/or update product, product content, and/or advertising information that is provided to the back end system 70. Such access can also allow the third parties to receive information directly or indirectly from users 52, thereby further reducing the amount of data or associated activities that retailers have to manage and/or track. By allowing the retailer to combine technical resources to streamline the management process, third party integration system 84 can provide an improved experience for the user 52.

The third party integration system 84 can be adapted to establish one or more third party integrations. For example, the exemplary embodiment depicted in FIG. 1 has four third party integrations, namely, an electronic commerce ("e-commerce") integration 86, a digital coupon integration 88, and loyalty program integration 90, and a point of sales integration 92. According to certain embodiments, all third party integrations are contemplated to communicate with the back end system 70. Alternatively, as illustrated in FIG. 1, at least certain integrations 86, 88 can, in addition to, or in lieu of, being communicatively coupled to the back end system 70, can be directly or indirectly communicatively coupled to the front end system 68, such as, for example, by communication links 94, 96, 98, while other integrations 90, 92 can be directly or indirectly communicatively coupled to the back end system end system 70 by other communication links 102, 104. The communication links 94, 96, 98, 102, 104 can take a variety of forms, including, for example, be provided by a API, file integration, file transfer protocol (FTP), extract, transform and load (ETL), or a dynamic connection, as well as combinations thereof, among others.

The e-commerce integration 86 can correspond to an integration of a retailer and/or the DDACS 50 with a third party e-commerce provider. Such an integration can provide a third party e-commerce provider access to the DDACS 50 so that the e-commerce provider can upload content to the back end system 70, including updated product information, such as, but not limited to, information including sale offerings, promotional materials, product offerings, and/or price discounts, among other information, for products from the e-commerce provider that are sold by the retailer. Allowing third party e-commerce provider to provide such information to the back end system 70, can reduce a content management burden on the retailer, particularly when the retailer would otherwise receive such updated information from a plurality of different a third party e-commerce providers for a plurality of different products.

Such access to DDACS 50 by third party e-commerce providers, and, moreover, access provided by the e-commerce integration 86, can also be configured to manage the sale and/or distribution of products that are purchased by a user 52. For example, the e-commerce integration 86, among other portions of the DDACS 50, accommodates items selected for the purchase by the user 52 while using the front end system 68 to be stored in a virtual shopping cart for that user 52. The e-commerce integration 86 can accommodate, with or without the knowledge of the user 52, items or products of the e-commerce provider in the shopping that are being sold by or through the retailer to an area that is retrievable by the associated third party e-commerce provider. Such movement of products can happen automatically each time a user 52 adds an item to their shopping cart, and/or can happen manually after a user 52 has built a shopping list by and has proceed to checkout or otherwise complete the purchase of the item(s) in the shopping list of the user 52.

The digital coupon integration 88 can be adapted to allow users 52 to view digital coupon offerings from third parties, including, but not limited to, product manufacturers or distributors, among others, directly within the front end system 68. Such coupons, and/or corresponding hyperlinks or other information, can be virtually clipped or otherwise stored to a virtual wallet of the user 52 within the front end system 68. The digital coupon integration 88 can also be configured to accommodate third parties offering such coupons, or other sales incentives, to personalize such coupons for certain users 52, groups of users 52, and/or target audiences. Additionally, or alternatively, digital coupons can be configured to be store or retailer specific, such as, for example, being specific to a particular store or retailer location.

The loyalty program integration 90 can correspond to loyalty programs offered by third parties, such as, for example, programs offered by third party manufacturers or distributors, among others, whose products are sold by retailers of the DDACS 50. According to certain embodiments, embodiments, such loyalty program integration 90 can provide such third parties to historical information maintained by the DDACS 50, and/or maintained by the DDACS 50 for specific pre-identified retailers. Such historical information can include a purchase history of users 52 on an individual, retailer, and/or on a product basis, as well as combinations thereof. Further, the loyalty program integration 90 can accommodate retailers having access to loyalty program information that is maintained by third parties, such as, for example, points accrued in a loyalty program(s) and/or user 52 eligibility for pricing or other benefits based on certain achievements the user 52 has obtained through participation in the loyalty program(s).

The point of sales integration 92 can provide visibility into store level inventory and pricing. For example, the point of sales integration 92 can provide third parties with access to information, on a retailer level, related to available inventory and pricing relating to products of, or relating to, the third party that are being sold through or by the retailer. The point of sales integration 92 can also provide third parties with access to sales information, sales quantity, prices paid for products, and details regarding the particular users 52 that purchased particular products, including personal identification information and/or demographics for those users 52.

As seen in FIG. 1, at least portions of the third party integration system 84, such as, for example, the loyalty program integration 90 and/or the point of sales integration 92 can be communicatively coupled to a personalization artificial intelligence (AI) engine 100 of the DDACS 50. According to certain embodiments, the personalization AI engine 100 is part of the back end system 70. According to certain embodiments, the personalization AI engine 100 is a neural network that can utilize recorded and/or stored information to build personality profiles. Such personality profiles can relate to predictions relating to the types of product(s) a user 52, and/or users 52 having one or more particular types of identified characteristics, may, or may not, be likely purchase, and/or the types of advertising, discounts, and/or incentives that may, or may not, generate product sales from that/those identified user(s) 52. Further predictions generated by the a neural network of the personalization AI engine 100 may result in a reorganization, or personalization in the arrangement, of products or categories of products that are presented to the user 52 via dynamic digital advertising content, such as a digital circular of the subject disclosure, that is displayed on display of the computing device of the user 52. Additionally, and/or alternatively, such personalization can involve certain products being removed from, and/or certain products being added to, a current generic version of the digital circular, thereby further personalizing the dynamic digital advertising content that is depicted in the digital circular that is presented to the user(s) 52. The personalization attained via use of the prediction(s) from the personalization AI engine 100 can also include a generation and display of an ancillary personal webpage of that particular user 52, such as, for example, a "Just For Me" webpage, that can be displayed on the computing device of the corresponding user(s) 52. Such an ancillary personal webpage can be provided and populated with products selected based on predictions made by the neural network of the personalization AI engine 100 as to products most likely be purchased by that user 52.

According to certain embodiments, the accumulated, or inputted, data or information used by the neural network of the personalization AI engine 100 in developing a model(s) and/or identifying patterns, can include purchase history data, demographic information regarding the users 52 and the associated purchase history of those users 52, reward and/or loyalty program data or purchase history, and point of sale information. As seen in FIG. 1, at least a portion of information used to develop and refine the model(s) utilized by the neural network of the personalization AI engine 100, including in connection with self-learning, can be provided by the retail media network 108, the loyalty program integration 90 and/or the point of sales integration 92 of the third party integration system 84, among other portions of the back end system 70. However, the training and/or for machine based learning of the neural network of the personalization AI engine 100 can based on, or include, a variety of other types of information, including other information maintained by, or accessible to, the DDACS 50 regarding past behaviors, responses, and/or actions/inactions of users 52. Such analysis can assist the neural network of the AI engine 100 in developing and/or refining a model that can provide a prediction of characteristics of users 52 that may, or may not, be responsive to particular types of content presented in digital circulars, and, moreover, a prediction of the content to presented in a digital circular that can successfully facilitate sale of product(s). According to certain embodiments, the neural network of the personalization AI engine 100 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

A variety of different type of communication protocols can be used in connection with the connections 102, 104, 106, 108 between the AI engine 100 with the third party integration system 84, the retail media network 108, and the back end system 70, including, for example, API, FTP ETL, and/or dynamic connections.

The ability to dynamically interact with promotional literature, such as digital circulars, can ease the shopping experience for users 52 by making shopping more appealing and efficient. Embodiments of the DDACS 50 can provide users 52 with the ability to relatively rapidly call up specific retailer locations and have access to up-to-date information on promotional items being offered by that retailer. Unlike traditional printed promotional circulars, retailers will also be able to update the content and customize, for purposes of display on the digital circular, the same with graphics, including animated graphics, without the need to wait for promotional cycle frequency. Further, unlike traditional printed promotional circulars, the DDACS 50 of the subject disclosure provides the ability include embedded videos and recipes in a digital circular, which can deliver useful content to users 52. Additionally, by the DDACS 50 enabling users 52 to share content with other users 52, including individual merchandise promotions and/or embedded content, a more rapid dissemination of information between users 52 can occur.

While the DDACS 50 shown in FIG. 1 and discussed above has various features, not all embodiments of the DDACS 50 need include each element/capability/connection indicated by the various reference numerals of FIG. 1. Moreover, come embodiments may include fewer of the elements/capabilities/connections discussed above and indicated by the various reference numerals of FIG. 1.

Digital Circular and Digital Circular Grid

As discussed above, the DDACS 50 can be utilized to generate and display a digital circular that can be personalized for particular user(s) 52, and can be generated on retailer specific level. In addition to being configured to dynamically select product content for the digital circular, the DDACS 50 can also be adapted to dynamically organize, display, as well as rearrange and/or resize product content in such a digital circular based, at least in part, in response to user 52 engagement with the digital circular.

Figure 5:
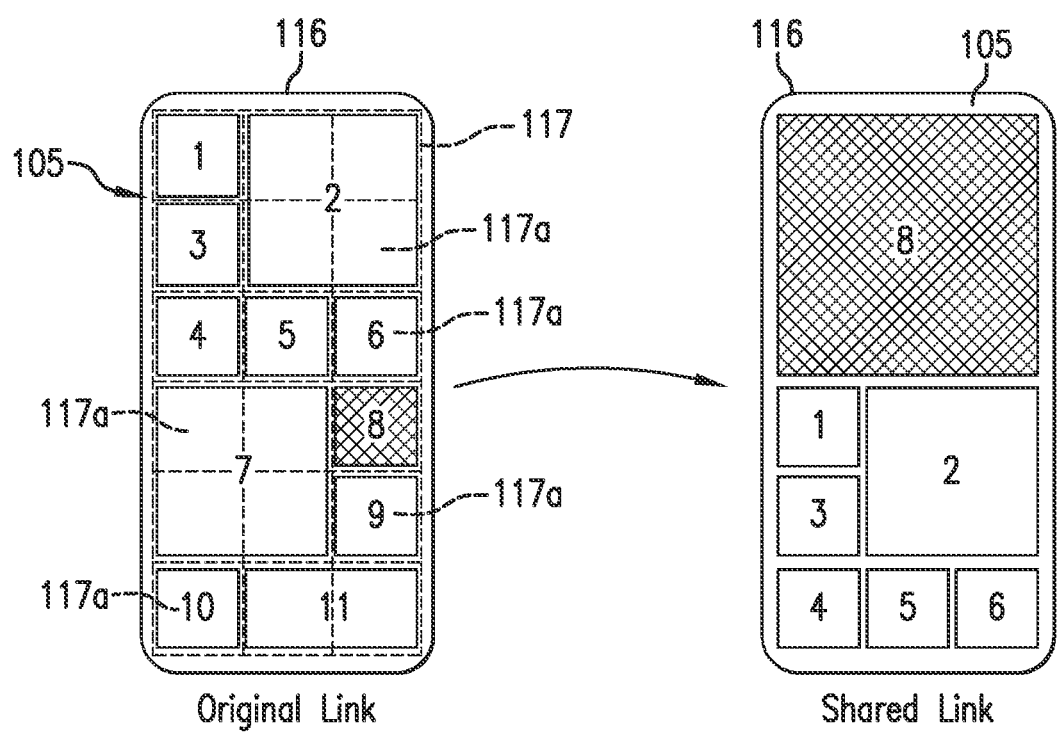
FIG. 5 illustrates an example of consumer devices engaged in a process of sharing a link or a card from a digital circular.

A generic representation of a digital circular 105 being shown on a display of an exemplary digital advertising content communications device 116 is shown in FIG. 5. The websites of the retailers can, through the DDACS 50, be displayed on the digital advertising content communications device 116 in a variety of manners, such as, for example, through a browser and/or a software application.

The illustrated digital advertising content communications device 116 is depicted in the form of a smartphone that display or screen that can also provide a user interface, at least one processor 225 (FIG. 3) structured to execute instructions, and a memory coupled to processor 225. The memory can include instructions that, when executed by the processor 225, can cause the processor 225 to receive from the user 52 a selection of a digital circular location. The memory can also include instructions that, when executed by the processor 225, cause the processor 225 to present the digital circular 105, and thus an arrangement of the item cards 1-11, to the end user 522 via the display. As discussed, the display can be, for example, a screen associated with the digital advertising content communications device 116.

Dynamic digital advertising content communications device 220 may receive from an end user 52 a selection of a digital circular location. The digital circular location is associated with a retail location that the end user 52 requests to view the digital circular based on a current time frame that the user 52 executes the selection of the digital circular location. The digital circular location is associated with a particular retailer, and moreover, a particular location or store associated with that retailer, for which the user 52 requests to view an associated the digital circular 105. The requested digital circular for a particular retailer or retailer location can be based, at least in part, on a current time frame and/or user location that the user 52 executes the selection of the digital circular location. Further, according to certain embodiments, the user 52 can request a digital circular location by either selection of a specific store location of a retailer, and/or be selection of a specific retailer. In some instances a specific retailer may have more than one physical location, with each location having a digital circular associated with that particular physical location.

As discussed above, the front end system 68 includes the ability to display, through the digital circular and via the digital advertising content communications device 116, unique content specific to a particular store(s) of the retailer. Such ability can permit a retail chain of the retailer to customize promotional materials for each store in its chain. The ability to display content such as a digital circular 105, for viewing consumption by a user 52 also includes the use of cookies to identify the particular digital advertising content communications device 116 used in the downloading of information, and/or to identify specific users 52. The cookies can be used to identify various details described herein as will be appreciated. However, according to certain embodiments, each retail location within a chain of stores can have, or have and/or the option to have, its own website. Such individual websites can permit store specific contact information to be published, as well as hyperlocal content to be published to an individual store. For example, a store in one geographic location may have ready access to locally harvested honey sold under the brand "Bob's Honey," but which supply of the honey is not readily available in faraway locations of the retail chain. An individual website for separate stores permits digital circular advertising of the hyperlocal content such as "Bob's Honey", while not burdening the circulars of the faraway stores in the retail chain with the same product that is not available at those particular stores.

Dynamic digital advertising content communications device 220 may request a digital circular that includes a plurality of item cards 1-11 that are created based on a plurality of item card parameters that are customized to the digital circular location and current time of the selected digital circular location from a dynamic digital advertising content computing device based on the digital circular location. The item card parameters can be indicative to a presentation of each item card 1-11 as displayed in the digital circular, and can be customized to a retailer priority of a digital circular retailer associated with the digital circular location to advertise to the user 52 and to a purchase priority of the user 52 to purchase retail items from the digital circular retailer. Moreover, product content in the digital circular 105 can be arranged in a grid like pattern in a digital circular grid 117. The digital circular grid 117 can comprise a plurality of item cards 1-11 spatially positioned into a plurality of corresponding item card partitions or cells 117*a* of the digital circular grid 117 for the digital circular 105 to dynamically display each item card 1-11 in an item card position and an item card size associated with each item card partition 117*a* to prioritize the display of each item card 1-11 in the digital circular 105 based on a plurality of item card parameters associated with each item card 1-11. Item cards 1-11 will be understood as a representation of a particular item to be displayed on the digital advertising content communications device 116.

Dynamic digital advertising content communications device 220 may instruct user interface 260 to dynamically display each item card 1-11 in an item card position and an item card size associated with each item card partition 117*a* to prioritize the display of each item card 1-11 in the digital circular 105 based on the item card parameters. Each item card 1-11 is dynamically formatted with item card content to dynamically display each item card 1-11 with the item card content as spatially positioned in the digital circular grid 117 to prioritize the display of the item card content based on the item card parameters. Further, dynamic digital advertising content communications device 220 may be configured to dynamically instruct user interface 260 to display the digital circular grid 105 that is partitioned into the plurality of item card partitions 117*a*, wherein each item card partition 117*a* is displayed with a corresponding size and location in the digital circular grid 117 thereby enabling each item card 1-11 to be dynamically displayed in each corresponding item card partition 117*a* based on the item card parameters associated with each item card 1-11 in real-time.

Dynamic digital advertising content communications device 220 may dynamically receive updates to the digital circular 105 as to each item card partition 117*a* that each item card 1-11 is spatially positioned based on the size and location of each item card partition 117*a* and the item card parameters associated with each item card 1-11 as the item card parameters are updated in real-time thereby triggering a change in the item card partition 117*a* that each item card 1-11 is spatially positioned. Further, dynamic digital advertising content communications device 220 may dynamically instruct user interface 260 to display each updated item card partition 117*a* included in the digital circular 105 that each item card 1-11 is spatially positioned in real-time based on the size and location of each item card partition 117*a* as the item card parameters associated with each corresponding item card 1-11 are updated in real-time triggering a change in the item card partition 117*a* that each item card 1-11 is spatially positioned based on the size and location of each corresponding item card partition 117*a*.

Thus, in one form, the digital circular grid 117 comprises a plurality of item cards 1-11 spatially positioned into a plurality of corresponding item card partitions or cells 117*a* of the digital circular grid 117 of the digital circular 105. Thus, each item card 1-11 can be dynamically display an item card position, which can correspond to a card petition(s) or cell(s) 117*a*, and with item card size associated with how many card petitions or cells 117*a* are to be occupied by the cart item 117*a*. Further, the products can be prioritized in terms of which card petitions or cells 117*a* the associated card item 1-11 is to occupy, and whether certain item cards 1-11 for certain products are to have priority at certain card petitions or cells 117*a* over item cards 1-11 associated with other products. The item card parameters can thus be indicative to a presentation of each item card 1-11 as displayed in the digital circular 105, and can be customized to prioritize purchase of products by the user 52 from a particular retailer, or retailer location, associated with the digital circular 105.

Item cards 1-11 can represent individual products, a grouping of products, a recipe, etc. Item card parameters can be set by a seller in the back end system 70, such as, for example, via parameters related to system settings defined in a spreadsheet or table 20 and uploaded by the retailer, where the item card parameters dictate the size of each item card 1-11 and can also dictate the priority given to each item card 1-11. Thus, the item cards 1-11 of the digital circular 105, as displayed via the digital advertising content communications device 116 by the front end system 68, can include an arrangement of products or merchandise that lists any variety of information about the products/merchandise, including but not limited to product name, picture, and price, among other information.

As previously mentioned, the item card parameters are indicative to a presentation of each item card 1-11 as displayed in the digital circular on the digital advertising content communications device 116, and are customized to the particular retailer associated with the digital circular location to advertise product(s) to, and entice purchasing by, the user 52. Each item card 1-11 is dynamically formatted either upon rendering and/or display with item card content to dynamically display by each item card 1-11. Further, the item card content can be spatially positioned in the digital circular grid 117 to prioritize the display of the item card content based on the item card parameters.

The digital circular 105 is shown as having an example of an arrangement of a plurality of item cards 1-11, all of which can act in concert with each other to display the digital circular 105. According to certain embodiments, the item cards 1-11 can correspond to product information provided by the above-discussed spreadsheet or table 20. Thus, for example, referencing the example provided by the table shown in FIG. 2, each item card 1-11 can correspond to a row shown in the table 20. Each row in the spreadsheet or table 20 can thus include relevant details necessary to populate the corresponding item card 1-11 when the digital circular 105 is displayed in a browser or software application on the digital advertising content communications device 116 of the user 52. For example, as previously discussed, in the exemplary illustration, each row in the table 20 can include the name of the product, sale price (or related promotional value), file name associated with the graphic (or animation), alphanumeric identifier of the associated video, start date of the promotion, end date of the promotion, and/or the size of the cell(s) 117*a* that the item card 1-11 is to occupy in the digital circular grid 117, among other information. Further, FIG. 2 is merely one example of information that can be provided to the back end system 70, including, for example, via one or more spreadsheets 20 and/or a dynamic connection(s), Moreover, the actual information provided to the back end system 70 may, or may not, include at least some, if any, of the particular information identified in the example spreadsheet 20 shown in FIG. 2, among other information. Thus, FIG. 2 provides a non-limiting example of information that may be provided to the back end system 70.

Additionally, as illustrated in FIG. 2, the table 20 can also include information relating to whether the item card 1-11 for a product is to be a hidden card. Such a designation can indicate that the item card for the product is not to be displayed in the digital circular 105 unless some particular action is taken by the user 52, such as, for example, be hidden until the user 52 selects a particular, other item card 1-11 and/or selects another feature shown on the display. For example, according to certain embodiments, a hidden item card 1-11 may become unhidden, and thus displayed on the display of the digital advertising content communications device 116 in response to the user selecting a recipe option that is displayed by, or navigated to, via interaction with the digital circular 105. In such an example, in response to the user selecting the recipe via engagement with the user interface, the recipe, as well as ingredients for the receipt, can be displayed on the display of the computing device. Such display of the recipe ingredients can thus cause a hidden item card to become visible. Alternatively, while viewing the recipe, a hidden item card 1-11 may become visible in response to the user 52 selecting the associated recipe ingredient.

The dynamic digital advertising content communications device 220 may receive the digital circular 105, which includes the plurality of item cards 1-11 from the dynamic digital advertising content computing device 210 that are spatially positioned into a corresponding item card partition 117*a* of a digital circular grid 117 for the digital circular 105. According to certain embodiments, in response to a user 52 requesting, via the digital advertising content communications device 116, a digital circular location, the front end system 68 can deliver, via channel 72, a digital circular 105 to the digital advertising content communications device 116. According to certain embodiments, the responsive communication from the front end system 68 that is received by the digital advertising content communications device 116 can include includes instructions that, when executed by the processor 225, cause the processor 225 to receive a digital circular grid 117 for the digital circular 105 that corresponds to a grid arrangement or format of product content for display on the digital advertising content communications device 116. FIG. 5 illustrates an exemplary digital circular grid 117 comprising a six row, three column (6×3) grid, and moreover a grid comprising eighteen 1×1 cells 117*a*. As seen in the exemplary depiction shown in FIG. 5, certain item cards 1-6, 10 occupy a single cell 117*a* (1×1 cell 117*a*), an item card 11 occupies a plurality of cells 117*a* in which the number of rows occupied by the item card 11 is not equal to the number of columns occupied that item card 11 (e.g. 1×2), and other item cards 2, 7 occupy a plurality of cells 117*a* in an equal number of rows and columns (e.g., 2×2). The actual number of cells 117*a* occupied by an item card 1-11, and moreover the size and arrangement of the item cards 1-11 in the digital circular grid 117 can vary, including vary during a session in which a user 52 is interacting with the digital circular 116, and thus interacting or engaging with the DDACS 50. Further, while FIG. 5 illustrates generally square shaped partitions or cells 117*a* in a generally rectangular digital circular grid 117, the partitions or cells 117*a* and/or the digital circular grid 117 can be configured to have a variety of other shapes. Thus, as will be appreciated from at least FIGS. 5-7, the digital circular grid 117 can be occupied with items cards 1-11, A, B of different sizes, and arranged with different sizes at various locations about the digital circular grid 117.

Additionally, the sizes of the partitions or cells 117*a* can be designated as a size having integer width and integer height, with the sum of the integer widths. For at least certain type of digital advertising content communications devices 116, such as, for example, smart phones, in order to adapted to the anticipated size of the display of the computing device, the front end system 68 can be adapted to limit the size of the digital circular grid 117, such as, for example, limiting the digital circular grid 117 to having a width corresponding to three partitions or cells 117*a*. In contrast to a computing devices having smaller screen sizes, the front end system 68 can also be adapted to, for computing devices having relatively large displays, such as, for example, desktop computing devices, be adapted to display the website of a retailer(s) with a larger digital circular grid 117 width, and thus have additional squares to be added to at least the width of the digital circular grid 117, including as the size of the browser window displayed on the computing device expands. Thus, in some forms, the type of computing device being used by the user can be detected by the front end system 68, and appropriate adjustments can be made by the front end system 68 to the digital circular 117 and/or to the number or width of the corresponding partitions or cells 117*a*.

Additionally, the size of the item card 1-11, A, B, among other information regarding the format of the cards 1-11, A, B, can be set by the retailer when configuring the digital circular 105, such as, for example, via the client portal 128. For example, with respect to at least certain embodiments that involve the use of uploading spreadsheets 20 to the back end system 70, the retailer can specify the size of a particular item card 1-11, A, B in the spreadsheet or table 20 that is uploaded through the client portal 128 to the back end system 70. Thus, the manner in which the size, among other formatting, of the item cards 1-11, A, B is/are specified by the retailer can vary based on the manner or type of system used to provide the information to the back end system 70. Moreover, according to certain embodiments, such information can, for example, be provided by a retailer via use of a user interface, among other manners or inputting or providing such formatting information. Further, the content can be dynamically formatted, such as, for example, via the front end system 68, to include product content in the item card 1-11, A, B.

In some situations, the sizes of the item card 1-11, A, B set by the retailer, by another designer of the digital circular on behalf of the retailer, can inadvertently result in one or more empty spaces, such as empty partitions or cells 117*a*, when all item cards 1-11, A, B are arranged as designated. For example, if all item cards 1-11, A, B are default to a partition or cell 117*a* size of 1×1, but a few cards are designated in to another size, such as, for example, a 2×2 and 3×3 size, such an arrangement may result in a bottom row of the digital circular 105 that has a single 1z1 item card. To resolve this issue, the front end system 68 can be configured to dynamically format some or all of the item cards 1-11, A, B by resizing one or more of the item cards 1-11, A, B to fit within the digital circular grid 117 such that no blank or empty partitions or cells 117*a* remains. Whether an item cards 1-11, A, B is capable of resizing can depend on the preference of the retailer, which the retailer can set in the back end system 70) or other limitations of the DDACS 50. It will thus be appreciated that the size of the item cards 1-11, A, B can be fixed or set by the retailer through the back end system 70, or, if unspecified, can be set to a default a size (e.g. 1×1), with back end system 70 having the ability to resize if needed. It will be appreciated that the dynamic formatting of item cards 1-11, A, B can also include resizing of any information associated with the item cards 1-11, A, B.

Dynamic digital advertising content communications device 220 may instruct the user interface 260 to dynamically adjust the display to display updates to the digital circular grid 117 based on updates to the item card content. The spatial position of each item card 1-11 as displayed by the user interface 260 is dynamically adjusted as the item card parameters associated with each item card are updated. Further, dynamic digital advertising content communications device 220 may dynamically receive updates to the digital circular as each item card 1-11 included in the digital circular 105 are updated based on the item card parameters associated with each corresponding item card 1-11 are updated in real-time. Each item card 1-11 changes as the corresponding item card parameters associated with each item card change. The dynamic digital advertising content communications device 220 may dynamically instruct the display to display each updated item card included in the digital circular in real-time as the item card parameters associated with each corresponding updated item card change in real-time.

The dynamic digital advertising content communications device 220 may dynamically receive updates to the digital circular 105 as a size associated with each item card 1-11 in the digital circular 105 is adjusted based on the item card parameters associated with each corresponding item card 1-11 are updated in real-time thereby triggering a change in size associated with each item card 1-11 as the corresponding item card parameters associated with each item card 1-11 change. Further, dynamic digital advertising content communications device 220 may dynamically instruct the user interface 260 to display each updated size of each updated item card 1-11 included in the digital circular 105 in real-time as the item card parameters associated with each corresponding updated item card 1-11 are updated in real-time triggering a change in size associated with each item card 1-11. Once the item cards 1-11, A, B are formatted, the item cards 1-11, A, B can be presented in the digital circular grid 117 to the end user 52 via the digital advertising content communications device 116. In some forms, the front end system 68 can be configured to dynamically receive and present updates to the digital circular grid 117 relating to product content that is to be shown in the item card(s) 1-A, B, and/or the spatial position of each item card 1-11, A, B as the item card parameters associated with each item card 1-11, A, B are updated. For example, if a retailer makes a change to the price of a product via the information uploaded to the back end system 70, such as, for example, a new, supplemented, and/or modified table 20, the front end system 68 can receive and communicate appropriate information to the digital advertising content communications device 116. Likewise, if a retailer adds and/or removes an item card 1-11, A, B, such as via edits or changes to the table 20, corresponding updates to the digital circular grid 117 can be received by the front end system 68 and communicated to the digital advertising content communications device 116 for display to the user 52. Still further, if a user 52 removes an item via the digital advertising content communications device 116 from the digital circular 105, updates to the digital circular grid 117 can be made (either through a subsequent request to the back end system 70 to update the circular 105 or processing by the front end system 68 to reflect the removal of the item card 1-11, A, B). Additionally, if a user 52 receives item cards 1-11, A, B from another user, the item cards 1-11, A, B displayed on the digital advertising content communications device 116 can be rearranged.

Dynamic digital advertising content communications device 220 may dynamically receive updates to the digital circular 105 as to the item card partition 117a that each item card 1-11 is spatially positioned is adjusted based on the item card parameters associated with each corresponding item card 1-11 are updated in real-time thereby triggering a change in the item card partition 117a that each item card 1-11 is spatially positioned as the corresponding item card parameters associated with each item card change. Dynamic digital advertising content communications device 220 may dynamically instruct the display to display each updated item card partition 117a included in the digital circular 105 in real-time as the item card parameters associated with each corresponding updated item card 1-11 are updated in real-time triggering a change in the item card partition 117a that each item card 1-11 is spatially positioned. In one example, the digital circular grid 117 received by the front end system 68 at a first instance of time includes a first item card 1-11, A, B at a first size, and wherein the digital circular grid 117 at a second instance of time includes the first item card 1-11, A, B at a second size, wherein the first size is different than the second size. Such a change in size can be the result of either the retailer setting an updated size on the back end system 70, or the user 52 selecting the item card 1-11, A, B so that the item card 1-11, A, B can be expanded for further exposition of details related to the product that may not be present or as visible in the initial unexpanded view. In some forms, the expanded item card 1-11, A, B occupies a 3×3 cell 117a arrangement or space. Additionally, in some embodiments, the digital circular grid 117 at the first instance of time can include the first item card 1-11, A, B at the first size at a first item card partition or cell 117a space, and wherein the digital circular grid 117 at the second instance of time includes the first item card 1-11, A, B at the second size in a second item card partition or cell 117a space. A re-arrangement of item cards 1-11, A, B can, for example, be the result of the retailer updating details of the digital circular 105 on the back end system 70, where such updates are then shared, such as, for example, either pushed or pulled, to the front end system 68 when a refresh occurs. Updated details potentially include a re-sizing of the item card 1-11, A, B, and/or its inclusion in a different grouping of products, among other changes or modifications.

In response to receiving a selection of an item card 1-11, A, B by the end user 52, the front end system 68 is configured, via input received from the digital advertising content communications device 116, to determine an item type of the selected item card 1-11, A, B. As will be appreciated, the item card 1-11, A, B presented on the digital advertising content communications device 116 can be selectable by the user 52 through a finger press, button click, swipe of a slider, among other engagements with a user interface of the digital advertising content communications device 116, and thereafter can be expanded on the digital advertising content communications device 116 to include other details of the item cards 1-11, A, B and/or actions associated with the item cards 1-11, A, B as will be described elsewhere herein. In some forms, the item type relates to the type of item card 1-11, A, B associated with the product, such as, for example, whether the item card 1-11, A, B is a recipe card, or a link to a video, among other various forms of the item types.

As will be appreciated from the description herein, the digital advertising content communications device 116 is further configured to dynamically receive updates to the digital circular 105 as each item card 1-11, A, B included in the digital circular 105 is updated based on the item card parameters associated with each corresponding item card 1-11, A, B being updated in real-time. With such updates, each updated item card 1-11, A, B can change as the corresponding item card parameters associated with that item card 1-11, A, B is changed. For example, when a retailer choses to update parameters to the back end system 70, corresponding changes can be reflected in real-time if content from the back end system 70 is pushed to the front end system 68. The digital advertising content communications device 116 is also further configured to dynamically instruct the display of the digital advertising content communications device 116 to display each updated item card 1-11, A, B included in the digital circular 105 in real-time. Thus, the item cards 1-11, A, B in the displayed digital circular 105 can be updated as the item card parameters associated with each corresponding updated item card 1-11, A, B are changed in real-time.

In keeping with updates to item cards 1-11, A, B, such as through changes to content provided by a retailer to the back end system 70, the digital advertising content communications device 116 is further configured to dynamically receive updates to the digital circular 105 as a size associated with each item card 1-11, A, B in the digital circular 105 is adjusted. Again, such changes in size can be based on the item card parameters associated with each corresponding item card 1-11, A, B being updated in real-time. Moreover, changes in item card parameters can trigger a change in size associated with each item card 1-11, A, B as the corresponding item card parameters associated with each item card 1-11, A, B change. The digital advertising content communications device 116 can also dynamically instruct the display of the digital advertising content communications device 116 to display each updated size of each updated item card 1-11, A, B included in the digital circular 105 in real-time as the item card parameters associated with each corresponding updated item card item card 1-11, A, B are updated in real-time, thereby triggering a change in size associated with each item card 1-11, A, B.

Dynamic digital advertising content communications device 220 may dynamically receive updates to the digital circular 105 as to each item card partition 117*a* that each item card 1-11 is spatially positioned based on the retailer priority of the digital circular retailer to advertise to the user 52 and to the purchase priority of the user 52 to purchase retail items from the digital circular retailer, wherein the size and location of each item card partition 117*a* that each item card 1-11 is spatially positioned is based on the retailer priority of the digital circular retailer to advertise and the purchase priority of the user 52 to purchase retail items. Further, dynamic digital advertising content communications device 220 may dynamically instruct the display to display each updated item card partition 117*a* included in the digital circular 105 that each item card 1-11 is spatially positioned in real-time as the retailer priority to advertise and the purchase priority of the user 52 to purchase are updated in real-time triggering a change in the item card partition 117*a* that each item card 1-11 is spatially positioned based on the size and location of each corresponding item card partition.

Dynamic digital advertising content communications device 220 may dynamically receive updates to the digital circular 105 as to spatially positioning the item card 1-11 that has a decreased retailer priority and a decreased purchase priority in a second item card partition 117*a* that has a decreased size and a decreased centralized location as compared to item card partitions 117*a* with an increased size and increased centralized location. Item cards 1-11 with a decreased retailer priority and a decreased purchase priority are spatially positioned in corresponding item card partitions 117*a* with a decreased size and a decreased centralized location to decrease the likelihood of being identified by the user 52 as displayed to the user 52. Dynamic digital advertising content communications device 220 may dynamically instruct the display to display the second item card partition 117*a* that has the decreased size and the decreased centralized location with the item card 1-11 as the retailer priority and the purchase priority associated with the item card 1-11 decreased in real-time thereby triggering a change to being spatially positioned in the first item card partition 117*a* to decrease the likelihood of being identified by the user 52 as displayed to the user 52 based on the decreased retailer priority and decreased purchase priority associated with the item card 1-11.

The DDACS 50 is also configured to update the position of item cards 1-11, A, B based on whether a product associated with that item card 1-11, A, B is to be prioritized, or has either an increase or decrease in prioritization by the retailer. Such prioritization of the product associated with that item card 1-11, A, B can be based, in part, on the purchase history of the user 52 to which the digital circular 105 is begin generated. According to certain embodiments, such increase or decrease in prioritization can result in an adjustment is size and/or location of the card item 1-11, A, B within the digital circular grid 117, such that the associated item card 1-11, A, B is spatially positioned based on the product priority. Further, an increase in prioritization can result in an increase in size of the item card 1-11, A, B, as seen in digital circular 105 and/or placement of the card item 1-11, A, B in a partition(s) or cell(s) 117*a* located a higher and/or more central location in the digital circular grid 117. Conversely, a decrease in prioritization can result in an decrease in size of the item card 1-11, A, B, as seen in digital circular 105 and/or placement of the card item 1-11, A, B in a partition(s) or cell(s) 177*a* located at a lower and/or outer location in the digital circular grid 117. Such updates and changes in size and/or positioning of card items 1-11, A, B can be updated on the display of the digital advertising content communications device 116 generally in real time.

As previously discussed, the table 20 containing product content, at least some of which is displayed via an associated item card 1-11, A, B can include static images, animations, and/or video. Video can be embedded directly into the front end system 68 to allow consumers 52 to watch videos on the digital advertising content communications device 116 of any length, and with audio included. At least some, if not all, of such videos may be hosted by a third party such as, for example, YouTube or Vimeo, or, may be hosted directly on the back end system 70.

Information related to the video can be stored in the back end system 70 as thumbnails and an alphanumeric identifier known to the video provider. In one embodiment the back end system 70 can query a public facing API associated with a video provider to pull the video and embed it in to the displayed card. In this manner the content presented on the item card 1-11, A, B in the digital circular 105 can display a thumbnail when viewed by the user 52 on the digital advertising content communications device 116, and can thereafter be replaced with the embedded video on the digital advertising content communications device 116 if the user 52 selects, via the user interface 260, the item card 1-11, A, B. Specifically, a thumbnail video can be used in place of the video until selection by the user 52 and, when selected, the item card 1-11, A, B can be dynamically re-formatted by the front end system 68 in which the item card 1-11, A, B thumbnail content is replaced with an embedded video.

If video is uploaded to the back end system 70, the back end system 70 can be configured to compress the video into different formats useful for different devices and operating systems. When a user 52 scrolls to the card designated to display the animation, the front end system 68 can detect the type of device and operating system (e.g. by consuming metadata from the browser) of the digital advertising content communications device 116, and select the appropriate format. If the digital advertising content communications device 116, including the associated operating system, is not supported, a still image can be taken from the uploaded animation and displayed in the consumer's browser on the digital advertising content communications device 116. The still image can either be designated by the user on the digital advertising content communications device 116, by an operator of the back end system 70 via the digital advertising content communications device 116, or can be designated as an image available at a certain time within the animation (e.g. an image available 1 second, among other times, after start of the animation, or available 30% into the animation, among other possibilities).

In response to receiving a selection of a particular item card 1-11, A, B by the end user 52, such as, for example, through use of a user interface of the digital advertising content communications device 116, an item type associated with the selected item card 1-11, A, B can be determined. The item type can include whether the selected item card 1-11, A, B is associated with an individual product, a family of products, and/or a recipe, video, or animation. In short, several different types of item cards 1-11 are contemplated for display with the digital advertising content communications device 116, as will be appreciated from the discussion herein.

The front end system 68 can also be configured to receive from the user 52 a selection of a category selector useful to group products/merchandise by category. Specifically, the item cards 1-11, A, B can be arranged into categories determined by information designated by the retailer and stored in the back end system 70. The front end system 68 can be configured to display the item cards 1-11, A, B into respective categories to which the item cards 1-11, A, B belong by activating a category selector, or can be configured to ignore categories if such selector is not activated. Such selection of whether or not to segregate item cards 1-11, A, B into categories can be made by the retailer via the back end system 70, which can be enabled by the retailer computing device 210 (FIG. 2), the user 52 on the digital advertising content communications device 116, or both. To set forth an example, milk and yogurt and cheese can be grouped into a "dairy" category, hamburger buns and hot dog buns can be grouped into a "bread" category, and so on. The category selector is associated with a category selector arrangement of the digital circular 105 wherein the plurality of item cards 1-11, A, B are spatially grouped in the digital circular 105 such that a first group of items cards from the plurality of item cards 1-11, A, B associated with a first category are spatially grouped together and a second group of items cards from the plurality of item cards 1-11, A, B associated with a second category are spatially grouped together apart from the first group. To continue with the example from above, products in the "bread" category can be grouped together and set apart from products in the "dairy" category. Each of the items cards 1-11A, B can have an item card parameter specifically designating which category to which the item card 1-11, A, B belongs. If an item card 1-11, A, B does not have an item card 1-11, A, B parameter designating a particular group then the front end system 68 need not include it in any category if sorted by category by the user 52.

A user 52 can add, via the digital advertising content communications device 116a, an item card 1-11, A, B shown on the digital circular 105 to a shopping list that can be viewed on the digital advertising content communications device 116 by selecting the item card 1-11, A, B. The shopping list can include a list of items chosen by the user via the digital advertising content communications device 116. The shopping list can be populated either through the inclusion of a recipe on the shopping list, or through selection by a user 52 of individual item cards 1-11, A, B in the digital circular 105. Items can be added or removed at will on the selection of the user 52 via the digital advertising content communications device 116. According to certain embodiments, the details of the selected item card 1-11, A, B can be expanded by the front end system 68 on the display of the digital advertising content communications device 116, before being added to a shopping list. Further, the shopping list can be maintained on the communication device 116, the front end system 68, and/or the back end system 70.

Dynamic digital advertising content communications device 220 may receive a selection from a user 52 that requests an item card 1-11 to be expanded to display item card details associated with the selected item card 1-11 not previously viewable in the digital circular 105 initially displayed to the user 52. Dynamic digital advertising content communications device 220 may dynamically instruct user interface 260 to display an expanded item card detail view that displays the item card details associated with the selected item card 1-11 not previously viewable in the digital circular 105 initially displayed to the user 52. The expanded item card detail view replaces the digital circular 105 initially displayed to the user 52. The addition of product to the shopping list can be accomplished by the user 52 selecting, via the digital advertising content communications device 116, an expanded item card 1-11, A, B (e.g. selecting a 'shopping list' icon, etc.). In response to receiving the identification of the targeted item card 1-11, A, B selected by the end user 52, the front end system 68 can add the targeted item card 1-11, A, B to the shopping list for that digital advertising content communications device 116. The front end system 68 can also be configured to store a shopping list having a collection of item cards 1-11, A, B related to promotional items and/or hidden item cards 1-11, A, B associated with recipes that can become viewable on the digital advertising content communications device 116 in response to a user 52 making a selection on the digital advertising content communications device 116 that opens or expands an associated recipe. The shopping list can be viewable on the digital advertising content communications device 116 in a number of different manners. For example, the shopping list can be accessed through the push of a display button on the digital advertising content communications device 116 and/or loaded to the screen on the digital advertising content communications device 116.

The front end system 68 can also enable the functionality to share a shopping list from one consumer to another consumer, also referred to as a shared recipient. Moreover, the front end system 68 can also accommodate the sharing of selected items, including items selected for the shopping list, between different user digital advertising content communications devices 116, 116a. Such sharing, can include, for example, sharing items from the shopping list of one or more user digital advertising content communications devices 116, 116a. Thus, items can be selected and shared by one digital advertising content communications device 116 to another other digital advertising content communications device 116a, including a digital advertising content communications device 116a of another, or different, user 52. In some instances, such selection can be pushed to the digital advertising content communications device 116 of the user 52 by a selection, by that user 52 or another user, of an item card 1-11, A, B via use of a different digital advertising content communications device 116a. For example, selections made on one digital advertising content communications device 116 from a recipe can be added to, or shared with, a shopping list that is one another digital advertising content communications device 116a, and vice versa.

Examples of dynamic digital advertising content communications device 220 may include a mobile telephone, a smartphone, a workstation, a portable computing device, other computing devices such as a laptop, or a desktop computer, cluster of computers, set-top box, a product inventory checking system and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

The front end system 68 can also provide the ability to permit the user 52 to "Proceed to Checkout" and have items from the shopping list be purchased online and available for pickup at the store or delivery to the home.

In some forms, a digital advertising content communications device 116a can receive, via the front end system 68, one or more item cards 1-11, A, B that were sent from another digital advertising content communications device 116, including a digital advertising content communications device 116 of another user. Further, in such situations, the DDACS 50 can be configured, via the front end system 68, to dynamically format the digital circular 105 shown on the digital advertising content communications device 116a that is receiving the shared item cards 1-11, A, B so as to prioritize in the item cards 1-11, A, B that are being sent from the other digital advertising content communications device 116. In this form, one or more functional blocks of the DDACS 50 may receive a plurality of item cards 1-11, A, B transmitted from one digital advertising content communications device 116, insert the transmitted plurality of item cards 1-11, A, B into a plurality of corresponding partitions or cell 117a into a digital circular grid 117 of a digital circular 105, and communicate that digital circular 105 to the other digital advertising content communications device 116a. Further, the DDACS 50 can be configured to insert transmitted item cards 1-11, A, B at one or more preselected locations in the digital circular grid 117, such as, for example, along the top row of the digital circular grid 117 and/or increase a size of the transmitted item cards 1-11, A, B in connection with prioritizing those item cards 1-11, A, B.

Such an example is provided by FIG. 5, wherein a single item card 8 is shared from a first digital advertising content communications device 116 to a second digital advertising content communications device 116a, and, moreover, to a shared recipient. In this example, a user 52 has chosen to share product content, as represented by item card 8, with another user 52, or shared recipient, by selecting such action using the digital advertising content communications device 116. In some embodiments, a link corresponding to digital circular 150 that was provided to the digital advertising content communications device 116 of the first user can with, or loaded onto the digital advertising content communications device 116a, of the shared recipient, but with particular changes relating to the reorder and/or size of the displayed item cards 1-11. Moreover, as seen, while, with respect to the digital circular 105 shown on the first digital advertising content communications device 116, item card 8 is positioned in a single cell 117a located on at an outer portion of a mid-section of the digital circular grid 117. The DDACS 50 however reformats the digital circular 105 for the second digital advertising content communications device 116a so that item card 8, as seen on the digital circular 105 shown in the second digital advertising content communications device 116a, is increased in size and is positioned at the top section and/or rows of the digital circular grid 117 of the digital circular 105. Further, in the illustrated embodiment, the reordering of the item cards 1-11, and associated resizing of item card 8, can result in item card 8 being automatically expanded to a size associated with an expanded or detail view. It is also worth noting that item cards 1-7, 9-11 below item card 8 can be resized by the front end system 68 if necessary, using any of the techniques disclosed herein. For example, moving item card 8 to the top of the screen on the digital advertising content communications device 116 could leave an opening or blank space at the original location of item card 8, as seen in the digital circular 105 shown in the first digital advertising content communications device 116. To avoid a blank space, any of the other item cards 1-7, 9-11 can be resized by the front end system 68 from their default or designated position (as determined by the configuration stored in the back end system 70) to be a different size.

Figure 6:
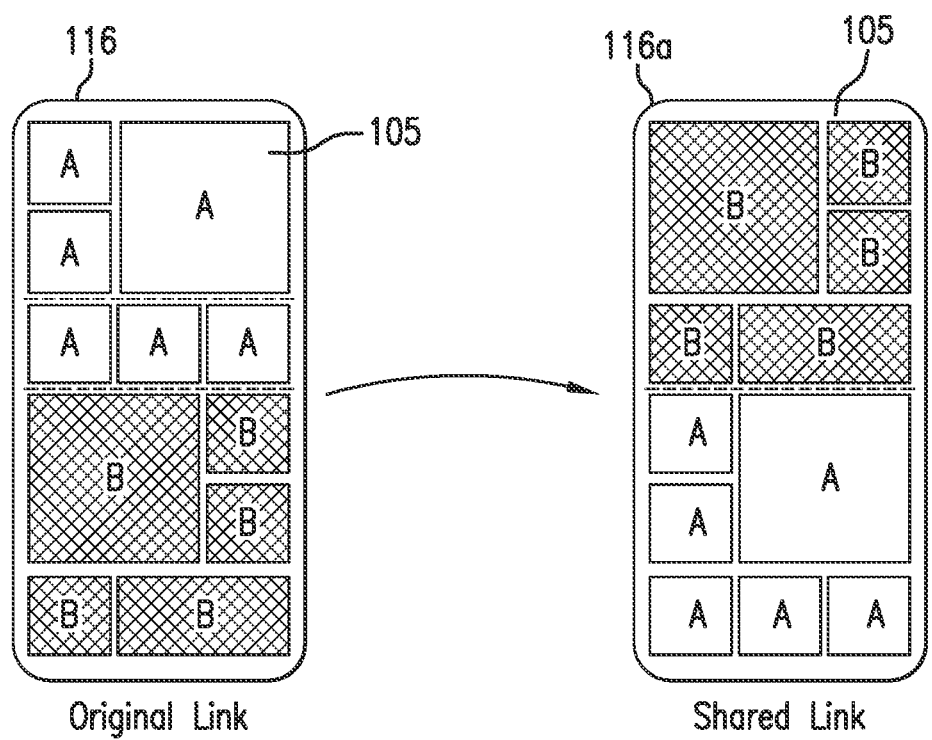
FIG. 6 depicts another example of consumer devices engaged in a process for sharing a link to a category of cards from a digital circular.
Figure 7:
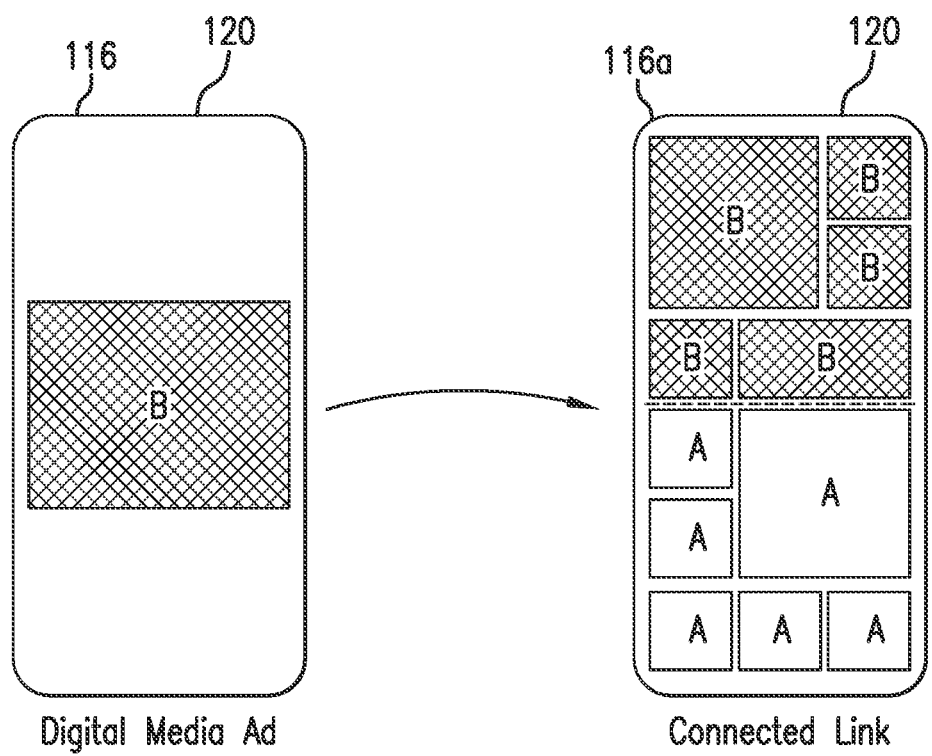
FIG. 7 depicts an example of consumer devices being used in the selection of a digital media ad for a category of products and being routed to a website having an associated category of cards for the first category of products displayed in the circular ad.

FIGS. 6 and 7 also further illustrate various embodiments of receiving to the front end system 68 one or more item cards 1-11, A, B from another user. FIG. 6 is similar to FIG. 5, but on the basis of a category of item cards B being shared, instead of just a single card. Moreover, the user 52 of the first digital advertising content communications device 116 can select and shares all item cards in "Category B." The category can be based on a variety of different criteria, including for example, a based on an indication of a category to which the product can be grouped, as discussed above. The link provided from the digital advertising content communications device 116 to the front end system 68 can indicate that digital advertising content communications device 116a of the share recipient is loaded with the same webpage, and moreover, the same digital circular 105 that was uploaded by the first digital advertising content communications device 116, but with changes to the digital circular 105 so as to rank the item cards A, B associated with "Category B" so that item cards B appear at the top of the webpage, and item cards A associated with a category(ies) other than "Category B" are at a lower positon in the digital circular grid 117 and/or the digital circular 105.

Turning now to FIG. 7, using the methodology associated with the "Category Share" function depicted in FIG. 6, a digital media ad can use a "category share" link when driving traffic to a webpage. This permits the digital media ad for "Category B" to drive traffic to a webpage with "Category B" at the top of the page, or, alternatively permits the digital media ad to drive traffic to a webpage with "Category A", as shown at the lower portion of the gird shown in FIG. 7.

Using the methodology previously discussed above with respect to FIG. 7, digital ads can be used by political candidates to drive traffic to a centralized webpage, resulting in the rearrangement of categories to allow each candidate's content (category) to appear at the top of the webpage for all traffic driven by their Digital Ad Campaign. An expansive political unit such as a country can be divided into local regions, with groups of local regions comprising state regions, and all state regions comprising a national region. Each local region can be assigned its own webpage. Candidates on the national level can appear in all webpages, while candidates on the state level will appear in all regions comprising that state. Candidates on the local level will appear within a single local region, or a group of local regions. Such a political marketing system adapted to the framework of FIG. 7 can be used by a single political party, with different and separate systems created for each different participating political party.

In one form the front end system 68 can be used to initiate a conversion of a parent item card B to a child item card A, B, wherein the parent item card B includes item content directed to a grouping of goods, and wherein the child card includes item content directed to particular goods within the grouping of goods of the parent card. Some item cards A, B may be related to other cards through a parent-child relationship. For example, a parent item cards A, B may include information related to a family of products (e.g. Coca-Cola™), and through a selection of the parent item cards A, B the user 52 can be presented with a child item cards A, B related to distinct beverages within the family (e.g. Fanta™, Barg's™, etc.). The parent item cards A, B can take on any suitable size (subject to the width restrictions described herein in some embodiments). For example, the parent item cards A, B can be a 1×1 size card with 'Coca-Cola™' text appearing in the item card A, B. When selected on the digital advertising content communications device 116, the 1×1 parent item card A, B can be converted by the front end system 68 to a 3×3 child item card A, B. Other sizes for both parent and child item cards A, B are contemplated.

In some forms one or more item cards 1-11, A, B in the digital circular 105 is a recipe item card. The recipe card can be accessed by action from the user 52 via the digital advertising content communications device 116, such as but not limited to selecting the item card 1-11, A, B using a user interface of the digital advertising content communications device 116. In response to receiving a recipe card selection by the end user 52 of the recipe item card 1-11, A, B, the front end system 70 can present a recipe item over the digital circular grid 117 via the display. In some forms ingredients listed on the recipe item card 1-11, A, B can correspond to other item cards 1-11, A, B in the digital circular 105. However, in some forms ingredients listed on the recipe card can also include a hidden item card that is apart from the item cards 1-11, A, B in the digital circular 105. In particular, the hidden item card, including content of the hidden item card 1-11, may not at least initially be presented to the end user 58 via the display of the digital advertising content communications device 116 until the recipe card selection has been made by the end user 52. Thus, information associated with the recipes can be stored in the back end system 70 and displayed when needed by the front end system 68. Such information can include item cards for products that are not on promotional sale in the digital circular 105, but that nevertheless are available for viewing if the user 52 selects the recipe. Thus, such hidden cards can be considered 'hidden' until the recipe is selected by the consumer.

The user 52 may view information displayed on the digital advertising content communications device 116 related to a recipes that has been prepared by a retailer as the retailer seeks to promote ingredients useful in the recipe. If a user 52 selects a recipe card the ingredients can slide out of a side of the display screen. In some forms video content can be embedded into the display of the digital advertising content communications device 116 that is viewable by the user 52. The videos can include a guide on how to make the recipe. If desired, the user 52 can elect to add the recipe to a shopping list viewable on the device, and/or added to a cookbook also viewable on the device 116.

Pages related to the recipes can include static images, videos, instructions and ingredients, and retail products that may be added to the shopping list of the user 52. For example, if a user 52 selects a recipe card via the digital advertising content communications device 116, the user 52 can also be presented on the digital advertising content communications device 116 with a choice front end system 68 to add the ingredients to shopping list. The ingredients can be products promoted in the digital circular 105, including, for example, as being on sale, and/or can include products unrelated to products that are presently being promoted.

In some forms the digital circular 105 can include content displayed in the item cards 1-11, A, B in one language but, if selected via the digital advertising content communications device 116 by the user, can be changed to being displayed on the digital advertising content communications device 116 in another language. Thus, the content of the item cards 1-11, A, B can be dynamically re-formatted by the front end system 68 and/or the back end system 70 in which the display of the content of the item card 1-11, A, B in a first language is replaced with a second language. The item card 1-11, A, B content in the second language can also include a graphic having text displayed in the second language. Retailers may wish to configure the back end system 70 to provide support for as many languages as they prefer. Such configuration of the back end system 70 can include uploading information related to a first language as option "A" and information related to a second language as option "B." Additional options are contemplated. Such options include a title and description in a first language and similar information in a second language. As the table 20 may connect different images/animations/video with languages, changes in languages or language preferences can also change the images/animations/video, if any, provided in one or more item cards 1-11, A, B. A retailer may therefore assign multiple images to a specific item card or graphical card, e.g., if language "A" is selected image "A" is used, otherwise if language "B" is selected image "B" is used, and so on.

Once enabled, the web site can detect the language of preference set in the user's web browser on the digital advertising content communications device 116 and activate that language automatically. Users can also have the ability to toggle from one language to through interaction with the front end system 68 interface. As will be appreciated from the discussion herein, any item card 1-11, A, B can be selected by a user 52 on the digital advertising content communications device 116 through a swipe and/or button press, where such selection can activate the item card 1-11, A, B in a number of different manners. To set forth just one example, selecting an item card 1-11, A, B through a button push can be used to expand the selected item card 1-11, A, B to a larger size, such as, for example, from a 1×1 size to a 3×3 size, if not already 3×3. Such increase in size and also be accompanied by additional information for the selected product becoming viewable. In another non-limiting example, item card 1-11, A, B can be added to a shopping list through a button push or swiping on the item card 1-11, A, B.

The memory of the digital advertising content communications device 116 can include instructions that, when executed by the processor 225, cause the processor 225 to present updates to the digital circular grid, as provided to the digital advertising content communications device 116, such as, for example, via the channel 72. Such updates can include updates and/or changes in the product(s) and/or product content shown in the digital circular 105 via one or more of the item cards 1-11, and/or changes in the spatial position of one or more, if not all, of the item cards 1-11 in digital circular grid 117.

The back end system 70 can generate a link using a unique extension added to a uniform resource locator (URL) for a given retailer, or specific retailer location, to provide the ability for that retailer to view a proof of the content and/or digital circular 105 that will be published in the future. The back end system 70 can also be configured to allow a retailer to show an advertising partner proof of performance by sharing a link to view what was published in the past, including viewing prior content for one or more products associated with that CPG/Vendor and/or previous versions of the digital circular 105. Such a URL can also be coded with an additional unique extension. For example, the URL used for a particular retailer can have a numeric extension added indicated the date and/or date range that particular content was made available to users 52 via the digital circular 105.

System Layout

Figure 3:
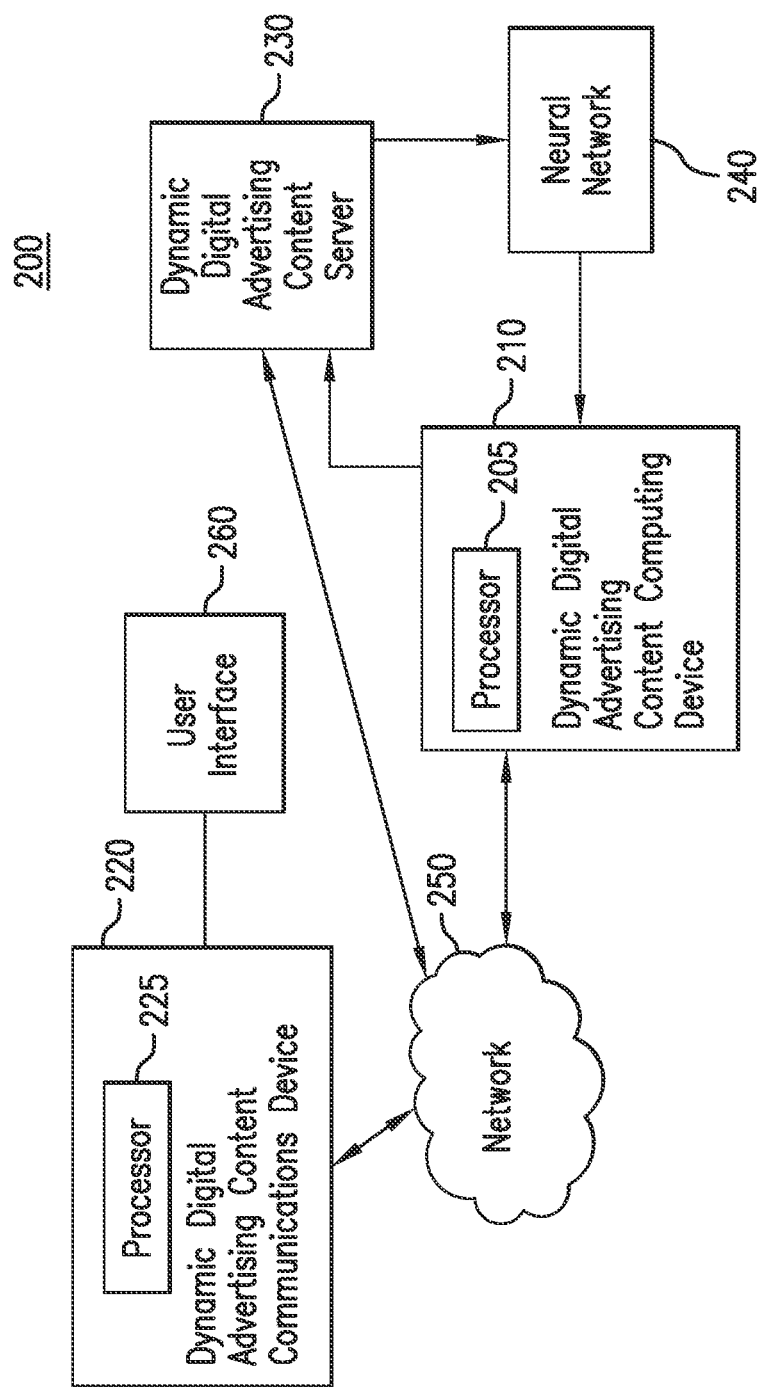
FIG. 3 illustrates a dynamic digital advertising content system that can accommodate interactions between a user and a retailer/client.

With particular reference to the system layout 200 depicted FIG. 3, and with continued reference to FIG. 1, the DDACS 50 can use several different types of communication devices (e.g. 225, 210) connected through any suitable network 250. The system layout 200 has many similar features as that discussed above with respect to the DDACS 50; therefore, only the differences between the system layout 200 and the DDACS 50 are to be discussed in further detail immediately below.

The illustrated dynamic digital advertising content communications device 220, which can also be referred to as the user computing device 220, of a user 52, includes one or more processors 225, a memory(ies), and a user interface 260. Moreover, the user computing device 250 can be similar to the digital advertising content communications devices 116 discussed above with respect to at least FIGS. 1 and 4. The user interface 260 can comprise various types of input devices and output devices, such as, for example, a screen, display, touch screen, keyboard, and/or mouse, as well as combinations thereof, among others.

The system can also include a computing device for the retailer, which is identified in FIG. 5 as a dynamic digital advertising content computing device 210, and which, for purposes of discussion, can be referred to as the retailer computing device 210. The retailer computing device 210 can includes one or more processors 205, a memory(ies), and a retailer interface. Moreover, the retailer computing device 210 can be similar to the types of computing devices discussed above, including, for example, be similar to the user computing device 250.

The computing devices 210, 220 are capable of interacting with each other via a network 250 and/or a dynamic digital advertising content server 230. In one form the dynamic digital advertising content server 230 is the back end system 70 depicted in FIG. 1. The computing devices 210, 220 can thus be used to initiate and/or receive transmissions through the network 250.

As illustrated in FIG. 3, the dynamic digital advertising content server 230 can further be coupled with a neural network 240 capable of being trained using input from a retailer or other user via the retailer computing device 210 and/or from information obtained from the dynamic digital advertising content server 230 (e.g. the back end system 70) to learn user 52 behaviors using information received from the digital advertising content communications device 220. According to certain embodiments, the neural network 240 comprises one or both of the neural networks discussed above with respect to the AI engine 80 and the personalization AI engine 100.

According to certain embodiments, the digital advertising content communications device 220 can generally continuously stream item card parameters to the dynamic digital advertising content server 230, which can be operated upon and/or stored in a database for further use. In doing so, the server 230 may continuously accumulate data. Over time as the data accumulated by the content server 230 continues to increase, the neural network 240, such as, for example, the previously discussed neural networks of the AI engine 80 and/or the personalization AI engine 100, may apply the data to the associated model(s), and, moreover, the one or more neural network algorithms, in connection with the continued learning of the neural network 240. Thus, as discussed above, the neural network 240 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

According to certain embodiments, each time item card parameters are streamed to the content server 230, the neural network 240 may assist the retailer computing device 210 by providing the retailer computing device 210 with an appropriate adjustment with regard to the appropriate item card parameters. Such an adjustment by the neural network 240, which may be based on, for example, on the above-discussed predictions provided by the personalization AI engine 100, can accommodate each item card 1-11, and thus the associated digital circular 105, being dynamically formatted, including formatted based on predictions provided by the personalization AI engine 100 regarding the user 52 to which the item cards 1-11 will be viewed. Thus, such dynamic formatting can include the selection of which products are to be presented in the digital circular 105, the particular content for those products that is to be presented in the item card(s) 1-11 in the digital circular, and/or the arrangement of the item cards 1-11 in the digital circular grid 117.

Again, the accuracy of the predictions of the neural network 240, and the associated adjustments and/or selections for the formatting of the digital circular 117, can continue to improve as the neural network 240 further learns or is furthered trained using the continued accumulation of data that is provided from the front end system 68 and/or the back end system 70. Thus, the accuracy and/or efficiency in terms of at least product sales and/or virtual traffic resulting from the determination of the item cards 1-11 that are displayed to the digital advertising content communications device 220 can be further enhanced by virtue of improving the accuracy of customization for each user 52 of the item cards 1-11 that are to be displayed in the digital circular 105 on the digital advertising content communications device 220.

The neural network 240 may assist the retailer computing device 210 in learning as to the display of digital circular 105s based on the item card parameters to push to the front end system 68 based on learned attributes of the user such that neural network 240 may further improve the success of any given promotion as displayed by the constantly changing digital circulars 105 that are customized and displayed for the user. For example, the neural network 240 may receive updated item card parameters as the user 52 engages the digital advertising content communications device 220 such as, but not limited, to internet browsing activity of the user 52. In such an example, the item card parameters may be associated with products in the digital circular 105 that are clicked by the user 52, via the user 52 computing device 220 as the user 52 conducts the internet browsing activity via digital advertising content communications device 220 in real-time. Real-time may be item card parameters that are generated by the user 52 as the user 52 engages the dynamic digital advertising communications device 220 and/or any period of time in which the item card parameters are generated and accumulated. The neural network 240 can be used to identify aspects of the user's preferences through any one of many machine learning or artificial intelligence methodologies. To set forth one non-limiting example, the neural network 240 can receive browsing activity as an input, and output product preferences. Browsing history includes such information as user 52 selections, via the communication device, of products of interest, number of selections, frequency of selections, time of day of selections, location of selections, etc. Such product preferences can be one of type of manufacturer and/or type of food stuff, where such output can be pushed to a particular user's 52 digital circular 105, as displayed on the dynamic digital advertising content communications device, where the product preferences output from the neural network 240 can be displayed. In some forms the neural network 240 can also output recommended time of day for pushes of product recommendations. In another non-limiting form, the neural network 240 can receive as input browsing activity of a plurality of users 52 across a plurality of retailer locations, and the neural network 240 can be configured to output recommended products for display tied to any one or more of individual users or retailer locations.

The server 230 can include a processor, a memory, and a network interface. For example, the server 230 can include a data information system, data management system, web server, and/or file transfer server. The server 230 can also be a workstation, mobile device, computer, cluster of computers, set-top box, a cloud server or other computing device. In an embodiment, multiple modules may be implemented on the same server 230. Such a server 230 can also include software, firmware, hardware, or a combination thereof. Software may include one or more applications on an operating system. Hardware can include, but is not limited to, a processor, memory, and/or graphical user interface display.

As previously discussed, the digital advertising content communications device 220 is structured to select a digital circular location, wherein the digital circular location is associated with a retail location for which the user 52 requests to view an associated digital circular 105. The version of the digital circular 105 that the user 52 is to receive can, for example, be at least partially based on a current time frame that the user executes the selection of the digital circular location. While in some forms the user 52 may only be able to pick a retailer name via the digital advertising content communications device 220 for display of a digital circular, in some forms the front end system 68 can provide the user 52 with the ability to select, via the user interface 260, a given store location of the retailer. It will be appreciated that in some embodiments a retailer may only have one location, or may only have one location in a region, or perhaps has a few locations within a region but wishes to use a common digital circular. In those situations the user 52 may be able to, via the digital advertising content communications device 220, select the retailer by the name of the retailer, or by the retailer name and location.

When the user 52 selects, using the digital advertising content communications device 220, a particular retailer or retailer location, a digital circular 105 for that selected retailer/retailer location is displayed, via the front end system 68, to the digital advertising content communications device 220. Again, the particular digital circular 105 displayed can be representative of the time period in which the digital circular is active. For example, the moment in time at which the user 52 selects via the digital advertising content communications device 220 the digital circular 105 by, for example, selecting the retailer and/or location of the retailer, the appropriate digital circular for that moment in time is displayed on digital advertising content communications device 220. However, in some forms the font end system 68 can be configured to allow the display, via the digital advertising content communications device 220, of past examples or versions of the digital circular 105. Additionally, and/or alternatively, in some forms the front end system 68 can be configured to allow the display on the digital advertising content communications device 220 of upcoming promotions and/or product offerings. In some forms the displaying of a digital circular 105 via the digital advertising content communications device 220 can also include the displaying of contact details for the particular retailer/retailer location.

The DDACS 50 is also structured to receive a the back end system 70 a request, via the front end system 68 and in response to engagement of the DDACS 50 of the user using the digital advertising content communications device 220, a digital circular 105 be generated that includes a plurality of item cards 1-11 based on a plurality of item card parameters that are customized to the digital circular location and current time of the selected digital circular location. In such an embodiment, the item card parameters can be indicative of a customized of each card item 1-11 based on the retailer associated with the digital circular. Moreover, such customization may be directed to advertising and prioritizing products in the digital circular 105 that are specific to that particular retailer. In one non-limiting example, a user 52 can select via the digital advertising content communications device 220 a city name, and thereafter select a particular retailer or retailer location within that city that is associated with a given digital circular 105. To aid the user in selecting a desirable retailer for purchasing goods via the digital advertising content communications device 220, the front end system 68 can also display via the digital advertising content communications device 220 the digital circular 105 in a formation such that a user can click on a map feature. The map feature can be configured direct the digital advertising content communications device 220 to the map application on the digital advertising content communications device 220 where a pin, or other location identifier, can be dropped in a map that is, or will be, displayed on the digital advertising content communications device 220. Selecting the pin by the user via the user interface 260 can either show via the digital advertising content communications device 220 details of the retailer/retailer location, and/or redirect the user 52 to a digital circular 105 prepared for that retailer/retailer location. In some embodiments, the front end system 68 can also provide, via the digital advertising content communications device 220, the ability to call that particular retailer/retailer location through any variety of actions such as clicking a button, a hyperlink, or activating a slider. In this manner, once requested, the digital advertising content communications device 220 is further structured to receive the digital circular 105 generated by the back end system 70 via the front end system 68. Such a received digital circular 105 can include the plurality of item cards 1-11 that are spatially positioned into a corresponding item card partition or cell 117*a* of the digital circular grid 117 for the digital circular 105.

When the user makes a retailer/retailer location selection using the user interface 260 of the digital advertising content communications device 220, the front end system 68 can request information related to the appropriate digital circular 105 from the back end system 70. Such a request can take the form of a request from an HTTP client using, for example, and API call. The back end system 70 can be configured to serve relevant digital circular information, including, for example, the digital circular 105, to the front end system 68 such as content that is stored on the back end system 70 in the form of a web page.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

CONCLUSION

In one form of the instant disclosure, DDACS 50 for displaying a digital circular 105 to a user 52 based on spatial positioning and dynamic content dynamically selected to visually organize and display a plurality of circular content items included in the digital circular 105, includes: a display; at least one processor; and a memory coupled with the processor, the memory including instructions that when executed by the processor cause the processor to: receive from an end user 52 a selection of a digital circular 105 location, wherein the digital circular 105 location is associated with a retail location that the end user 52 requests to view the digital circular 105 based on a current time frame that the user 52 executes the selection of the digital circular 105 location; request the digital circular 105 based on the digital circular 105 location; receive a digital circular grid 117 for the digital circular 105, wherein: the digital circular grid 117 comprises a plurality of item cards 1-11, A, B spatially positioned into a plurality of corresponding item card partition or cell 117*as* of the digital circular grid 117 for the digital circular 105 to dynamically display each item card 1-11, A, B in an item card 1-11, A, B position and an item card 1-11, A, B size associated with each item card partition or cell 117*a* to prioritize the display of each item card 1-11, A, B in the digital circular 105 based on a plurality of item card parameters associated with each item card 1-11, A, B, wherein the item card parameters are indicative to a presentation of each item card 1-11, A, B as displayed in the digital circular 105 and are customized to a retailer priority of a digital circular 105 retailer associated with the digital circular 105 location to advertise to the end user 52 and to a purchase priority of the end user 52 to purchase retail items from the digital retailer; and each item card 1-11, A, B is dynamically formatted with item card 1-11, A, B content to dynamically display by each item card 1-11, A, B the item card 1-11, A, B content as spatially positioned in the digital circular grid 117 to prioritize the display of the item card 1-11, A, B content based on the item card parameters; present the digital circular grid 117 to the end user 52 via the display; dynamically receive and present updates to the digital circular grid 117 with updates to the item content and the spatial position of each item card 1-11, A, B as the item card parameters associated with each item card 1-11, A, B are updated; and in response to receiving a selection of an item card 1-11, A, B by the end user 52, determine an item type of the selected item card 1-11, A, B.

The DDACS 50 further includes wherein the digital circular grid 117 received by the processor at a first instance of time includes a first item card 1-11, A, B at a first size (see, e.g. item 8 on dynamic digital advertising content communications device 116 in FIG. 5), and wherein the digital circular grid 117 at a second instance of time includes the first item card 1-11, A, B at a second size, wherein the first size is different than the second size.

The DDACS 50 further includes wherein the digital circular grid 117 at the first instance of time includes the first item card 1-11, A, B at the first size in a first item card partition or cell 117*a*, and wherein the digital circular grid 117 at the second instance of time includes the first item card 1-11, A, B at the second size in a second item card partition or cell 117*a*.

The DDACS 50 further includes wherein the digital circular grid 117 at the first instance of time and the second instance of time is defined by an item card 1-11, A, B grid, the item card 1-11, A, B grid having a width defined by a number of item card 1-11, A, B squares, and wherein the width of the digital circular grid 117 is defined by three item card 1-11, A, B squares.

The DDACS 50 further includes wherein each item card 1-11, A, B is limited to a minimum size of one item card 1-11, A, B square in width (see, e.g., item 1 on dynamic digital advertising content communications device 116 in FIG. 5), wherein each item card 1-11, A, B is limited to a maximum size of three item card 1-11, A, B squares in width, and wherein the first size has an item card 1-11, A, B square width different than the second size.

The DDACS 50 further includes wherein the digital circular grid 117 presented to the user 52 at the second instance of time is a result of the user 52 selecting the first item card 1-11, A, B for expansion to provide details not viewable in the digital circular grid 117 presented to the user 52 at the first instance of time.

The DDACS 50 further includes wherein the size of the first item card 1-11, A, B at the second instance of time is three item card 1-11, A, B squares in width and three item card 1-11, A, B squares in height.

The DDACS 50 further includes wherein the item card 1-11, A, B content includes one of a static image, a looping animation, and a video.

The DDACS 50 further includes wherein the memory also including instructions that when executed by the processor cause the processor to set the size of a video based item card 1-11, A, B such that the size of the video based item card 1-11, A, B is prohibited from being changed as a result of item card 1-11, A, B parameter updates.

The DDACS 50 further includes wherein the memory further including instructions that when executed by the processor cause the processor to receive from the end user 52 a selection of a category selector (e.g. a, wherein the category selector is associated with a category selector arrangement of the digital circular 105 wherein the plurality of item cards 1-11, A, B are spatially grouped in the digital circular 105 such that a first group of items cards from the plurality of item cards 1-11, A, B associated with a first category are spatially grouped together and a second group of items cards from the plurality of item cards 1-11, A, B associated with a second category are spatially grouped together apart from the first group.

The DDACS 50 further includes wherein the first group and second group of items cards each have a respective set of item card parameters, where the set of item card parameters each have an item card 1-11, A, B parameter related to a category type (e.g., all items listed as 'A' and 'B' in dynamic digital advertising content communications device 116 of FIG. 6 can each be separate categories), and wherein the spatial grouping of item cards 1-11, A, B is determined by the item card 1-11, A, B parameter related to category type wherein the memory further including instructions that when executed by the processor cause the processor to: receive a shopping list from another user 52; and in response to receiving a shopping list selection of a targeted item card 1-11, A, B by the end user 52, add the targeted item card 1-11, A, B to the shopping list received from the another user 52.

The DDACS 50 further includes wherein the memory further including instructions that when executed by the processor cause the processor to: receive a transmitted plurality of item cards 1-11, A, B from another user 52 (see, e.g., the illustration in FIG. 6); and in response to receiving the transmitted plurality of item cards 1-11, A, B from the another user 52, insert the transmitted plurality of item cards 1-11, A, B into a plurality of corresponding transmitted item card partition or cell 117as located at the top of the digital circular grid 117, wherein item cards 1-11, A, B present in the digital circular grid 117 prior to insertion of the transmitted plurality of item cards 1-11, A, B are caused to be located below the transmitted plurality of item cards 1-11, A, B.

The DDACS 50 further includes wherein the memory further including instructions that when executed by the processor cause the processor to: convert a parent item card 1-11, A, B to a child item card 1-11, A, B, wherein the parent item card 1-11, A, B includes item content directed to a grouping of goods, and wherein the child card includes item content directed to particular goods within the grouping of goods of the parent card.

The DDACS 50 further includes wherein at least one of the plurality of item cards 1-11, A, B is a recipe item card 1-11, A, B, wherein in response to receiving a recipe card selection by the end user 52 of the recipe item card 1-11, A, B, present a recipe item over the digital circular grid 117 via the display.

The DDACS 50 further includes wherein ingredients listed on the recipe item card 1-11, A, B correspond to select item cards 1-11, A, B from the plurality of item cards 1-11, A, B (e.g. select item cards 1-11, A, B in a digital circular 105 correspond to certain ingredients), and wherein ingredients listed on the recipe card also include a hidden item card 1-11, A, B that is apart from the plurality of item cards 1-11, A, B, the hidden item card 1-11, A, B including item card 1-11, A, B content not presented to the end user 52 via the display until the recipe card selection by the end user 52.

The DDACS 50 further includes wherein the item card 1-11, A, B content of at least one item card 1-11, A, B of the plurality of item cards 1-11, A, B includes a thumbnail video.

The DDACS 50 further includes wherein the memory including instructions that when executed by the processor cause the processor to present a dynamically re-formatted item card 1-11, A, B in which the item card 1-11, A, B content of the at least one item card 1-11, A, B is replaced with an embedded video in response to receiving a video selection of an item card 1-11, A, B by the end user 52.

The DDACS 50 further includes wherein the memory including instructions that when executed by the processor cause the processor to present a dynamically re-formatted item card 1-11, A, B in which the item card 1-11, A, B content of the at least one item card 1-11, A, B in a first language is replaced with an item card 1-11, A, B content in a second language.

The DDACS 50 further includes wherein the item card 1-11, A, B content in the second language includes a graphic having text displayed in the second language.

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A dynamic digital advertising content communications device for displaying a digital circular to a user based on spatial positioning and dynamic content dynamically selected to visually organize and display a plurality of circular content items included in the digital circular, comprising:
   at least one processor; and
   a memory coupled with the at least one processor, the memory including instructions that when executed by the at least one processor causes the at least one processor to:
   receive from the user a selection of a digital circular location, wherein the digital circular location is associated with a retail location that the user requests to view the digital circular based on a current time frame that the user executes the selection of the digital circular location,
   continuously stream item card parameters to a server as the item card parameters continuously fluctuate as generated by a digital circular generation system;
   automatically receive item card parameters that are updated as the item card parameters are continuously trained on by a neural network based on machine learning as the neural network continuously updates the item card parameters based on item card parameters generated from the user engaging past item cards positioned at past digital circular locations in past digital circulars;

request the digital circular based on the digital circular location that includes a plurality of item cards created that are customized to the digital circular location and a current time of the selected digital circular location from the digital circular generation system based on item card parameters, wherein the item card parameters are indicative to a presentation of each item card as displayed in the digital circular and are customized to a retailer priority of a digital circular retailer associated with the digital circular location to advertise to the user and to a purchase priority of the user to purchase retail items from the digital circular retailer, receive the digital circular that includes the item cards from the digital circular generation system that are spatially positioned into a corresponding item card partition of a digital circular grid for the digital circular, dynamically format each item card in an item card position and an item card size associated with each item card partition to prioritize the display of each item card in the digital circular based on the item card parameters to display in real-time, wherein each item card is dynamically formatted with item card content in real-time that is a current state of the item card parameters that are generated from selections by the user of different item cards in the digital circular as captured and streamed to the server to dynamically display each item card with the item card content as spatially positioned in the digital circular grid to prioritize the display of the item card content based on a current state of the item card parameters, continuously stream the item card parameters as the item card parameters continuously fluctuate depending on the selections by the user of different item cards as the item card parameters are accumulated by the server, dynamically adjust the digital circular grid to display updates to the digital circular grid based on updates to the item card content and integrating the item card parameters as the item card parameters are updated by the neural network as received from the neural network, wherein the spatial position of each item card as displayed by the display is dynamically adjusted as the item card parameters associated with each item card are updated, and stream the item card parameters as updated from selections by the user of different item cards in the digital circular to the server for the neural network to incorporate into a customized adjustment to continuously update the item card parameters for additional item cards in additional digital circulars.

2. The dynamic digital advertising content communications device of claim 1, wherein the processor is further configured to:

dynamically receive updates to the digital circular as each item card included in the digital circular are updated based on the item card parameters associated with each corresponding item card are updated in real-time, wherein each item card changes as the corresponding item card parameters associated with each item card change; and dynamically adjust the digital circular grid to display each updated item card included in the digital circular in real-time as the item card parameters associated with each corresponding updated item card change in real-time.

3. The dynamic digital advertising content communications device of claim 2, wherein the processor is further configured to:

dynamically receive updates to the digital circular as a size associated with each item card in the digital circular is adjusted based on the item card parameters associated with each corresponding item card are updated in real-time thereby triggering a change in size associated with each item card as the corresponding item card parameters associated with each item card change; and dynamically adjust the digital circular grid to display each updated size of each updated item card included in the digital circular in real-time as the item card parameters associated with each corresponding updated item card are updated in real-time triggering a change in the size associated with each item card.

4. The dynamic digital advertising content communications device of claim 3, wherein the processor is further configured to:

dynamically receive updates to the digital circular as to the item card partition that each item card is spatially positioned is adjusted based on the item card parameters associated with each corresponding item card are updated in real-time thereby triggering a change in the item card partition that each item card is spatially positioned as the corresponding item card parameters associated with each item card change; and dynamically instruct the display to display each updated item card partition included in the digital circular in real-time as the item card parameters associated with each corresponding updated item card are updated in real-time triggering a change in the item card partition that each item card is spatially positioned.

5. The dynamic digital advertising content communications device of claim 4, wherein the processor is further configured to:

dynamically instruct the display to display the digital circular grid that is partitioned into the plurality of item card partitions, wherein each item card partition is displayed with a corresponding size and location in the digital circular grid thereby enabling each item card to be dynamically displayed in each corresponding item card partition based on the item card parameters associated with each item card in real-time.

6. The dynamic digital advertising content communications device of claim 5, wherein the processor is further configured to:

dynamically receive updates to the digital circular as to each item card partition that each item card is spatially positioned based on the size and location of each item card partition and the item card parameters associated with each item card as the item card parameters are updated in real-time thereby triggering a change in the item card partition that each item card is spatially positioned; and dynamically instruct the display to display each updated item card partition included in the digital circular that each item card is spatially positioned in real-time based on the size and location of each item card partition as the item card parameters associated with each corresponding item card are updated in real-time triggering a change in the item card partition that each item card is spatially positioned based on the size and location of each corresponding item card partition.

7. The dynamic digital advertising content communications device of claim 6, wherein the processor is further configured to:
dynamically receive updates to the digital circular as to each item card partition that each item card is spatially positioned based on the retailer priority of the digital circular retailer to advertise to the user and to the purchase priority of the user to purchase retail items from the digital circular retailer, wherein the size and location of each item card partition that each item card is spatially positioned is based on the retailer priority of the digital circular retailer to advertise and the purchase priority of the user to purchase retail items; and
dynamically instruct the display to display each updated item card partition included in the digital circular that each item card is spatially positioned in real-time as the retailer priority to advertise and the purchase priority of the user to purchase are updated in real-time triggering a change in the item card partition that each item card is spatially positioned based on the size and location of each corresponding item card partition.

8. The dynamic digital advertising content communications device of claim 7, wherein the processor is further configured to:
dynamically receive updates to the digital circular as to spatially positioning an item card that has an increased retailer priority and an increased purchase priority in a first item card partition that has an increased size and an increased centralized location as compared to item card partitions with a decreased size and decreased centralized location, wherein item cards with an increased retailer priority and an increased purchase priority are spatially positioned in corresponding item card partitions with an increased size and an increased centralized location to increase a likelihood of being identified by the user as displayed to the user; and
dynamically instruct the display to display the first item card partition that has the increased size and the increased centralized location with the item card as the retailer priority and the purchase priority associated with the item card increases in real-time thereby triggering a change to being spatially positioned in the first item card partition to increase the likelihood of being identified by the user as displayed to the user based on the increased retailer priority and increased purchase priority associated with the item card.

9. The dynamic digital advertising content communications device of claim 8, wherein the processor is further configured to:
dynamically receive updates to the digital circular as to spatially positioning the item card that has a decreased retailer priority and a decreased purchase priority in a second item card partition that has a decreased size and a decreased centralized location as compared to item card partitions with an increased size and increased centralized location, wherein item cards with a decreased retailer priority and a decreased purchase priority are spatially positioned in corresponding item card partitions with a decreased size and a decreased centralized location to decrease the likelihood of being identified by the user as displayed to the user; and
dynamically instruct the display to display the second item card partition that has the decreased size and the decreased centralized location with the item card as the retailer priority and the purchase priority associated with the item card decreased in real-time thereby triggering a change to being spatially positioned in the first item card partition to decrease the likelihood of being identified by the user as displayed to the user based on the decreased retailer priority and decreased purchase priority associated with the item card.

10. The dynamic digital advertising content communications device of claim 2, wherein the processor is further configured to:
receive a selection from the user that requests an item card to be expanded to display item card details associated with the selected item card not previously viewable in the digital circular initially displayed to the user; and
dynamically instruct the display to display an expanded item card detail view that displays the item card details associated with the selected item card not previously viewable in the digital circular initially displayed to the user, wherein the expanded item card detail view replaces the digital circular initially displayed to the user.

11. A dynamic digital advertising content method for displaying a digital circular to a user based on spatial positioning and dynamic content dynamically selected to visually organize and display a plurality of circular content items included in the digital circular, comprising:
receiving by a dynamic digital advertising content computing device from the user a selection of a digital circular location, wherein the digital circular location is associated with a retail location that the user requests to view the digital circular based on a current time frame that the user executes the selection of the digital circular location;
continuously stream item card parameters to a server as the item card parameters continuously fluctuate as generated by a digital circular generation system;
automatically receive item card parameters that are updated as the item card parameters are continuously trained on by a neural network based on machine learning as the neural network continuously updates the item card parameters based on item card parameters generated from the user engaging past item cards positioned at past digital circular locations in past digital circulars;
requesting the digital circular based on the digital circular location that includes a plurality of item cards created that are customized to the digital circular location and a current time of the selected digital circular location from the digital circular generation system based on the item card parameters, wherein the item card parameters are indicative to a presentation of each item card as displayed in the digital circular and are customized to a retailer priority of a digital circular retailer associated with the digital circular location to advertise to the user and to a purchase priority of the user to purchase retail items from the digital circular retailer;
receiving the digital circular that includes the item cards from the digital circular generation system that are spatially positioned into a corresponding item card partition of a digital circular grid for the digital circular;
dynamically format each item card in an item card position and an item card size associated with each item card partition to prioritize the display of each item card in the digital circular based on the item card parameters to display in real-time, wherein each item card is dynamically formatted with item card content in real-time that is a current state of the item card parameters that are generated from selections by the user of different item cards in the digital circular as captured and streamed to the server to dynamically display each item card with the item card content as spatially positioned in the digital circular grid to prioritize the display of the item card content based on a current state of the item card parameters;

continuously streaming the item card parameters as the item card parameters continuously fluctuate depending on the selection by the user of different item cards as the item card parameters are accumulated by the server;

dynamically adjusting the digital circular grid to display updates to the digital circular grid based on updates to the item card content and integrating the item card parameters as the item card parameters are updated by the neural network as received from the neural network, wherein the spatial position of each item card as displayed by the display is dynamically adjusted as the item card parameters associated with each item card are updated; and streaming the item card parameters as updated from selections by the user of different item cards in the digital circular to the server for the neural network to incorporate into a customized adjustment to continuously update the item card parameters for additional item cards in additional digital circulars.

12. The dynamic digital advertising content method of claim 11, further comprising:

dynamically receiving updates to the digital circular as each item card included in the digital circular are updated based on the item card parameters associated with each corresponding item card are updated in real-time, wherein each item card changes as the corresponding item card parameters associated with each item card change; and dynamically adjust the digital circular grid to display each updated item card included in the digital circular in real-time as the item card parameters associated with each corresponding updated item card change in real-time.

13. The dynamic digital advertising content method of claim 12, further comprising:

dynamically receiving updates to the digital circular as a size associated with each item card in the digital circular is adjusted based on the item card parameters associated with each corresponding item card are updated in real-time thereby triggering a change in size associated with each item card as the corresponding item card parameters associated with each item card change; and dynamically adjust the digital circular grid to display each updated size of each updated item card included in the digital circular in real-time as the item card parameters associated with each corresponding updated item card are updated in real-time triggering a change in size associated with each item card.

14. The dynamic digital advertising content method of claim 13, further comprising:

dynamically receiving updates to the digital circular as to the item card partition that each item card is spatially positioned is adjusted based on the item card parameters associated with each corresponding item card are updated in real-time thereby triggering a change in the item card partition that each item card is spatially positioned as the corresponding item card parameters associated with each item card change; and dynamically instructing the display to display each updated item card partition included in the digital circular in real-time as the item card parameters associated with each corresponding updated item card are updated in real-time triggering a change in the item card partition that each item card is spatially positioned.

15. The dynamic digital advertising content method of claim 14, further comprising:

dynamically instructing the display to display the digital circular grid that is partitioned into the plurality of item card partitions, wherein each item card partition is displayed with a corresponding size and location in the digital circular grid thereby enabling each item card to be dynamically displayed in each corresponding item card partition based on the item card parameters associated with each item card in real-time.

16. The dynamic digital advertising content method of claim 15, further comprising:

dynamically receiving updates to the digital circular as to each item card partition that each item card is spatially positioned based on the size and location of each item card partition and the item card parameters associated with each item card as the item card parameters are updated in real-time thereby triggering a change in the item card partition that each item card is spatially positioned; and dynamically instructing the display to display each updated item card partition included in the digital circular that each item card is spatially positioned in real-time based on the size and location of each item card partition as the item card parameters associated with each corresponding item card are updated in real-time triggering a change in the item card partition that each item card is spatially positioned based on the size and location of each corresponding item card partition.

17. The dynamic digital advertising content method of claim 16, further comprising:

dynamically receiving updates to the digital circular as to each item card partition that each item card is spatially positioned based on the retailer priority of the digital circular retailer to advertise to the user and to the purchase priority of the user to purchase retail items from the digital circular retailer, wherein the size and location of each item card partition that each item card is spatially positioned is based on the retailer priority of the digital circular retailer to advertise and the purchase priority of the user to purchase retail items; and dynamically instructing the display to display each updated item card partition included in the digital circular that each item card is spatially positioned in real-time as the retailer priority to advertise and the purchase priority of the user to purchase are updated in real-time triggering a change in the item card partition that each item card is spatially positioned based on the size and location of each corresponding item card partition.

18. The dynamic digital advertising content method of claim 17, further comprising:

dynamically receiving updates to the digital circular as to spatially positioning an item card that has an increased retailer priority and an increased purchase priority in a first item card partition that has an increased size and an increased centralized location as compared to item card partitions with a decreased size and decreased centralized location, wherein item cards with an increased retailer priority and an increased purchase priority are spatially positioned in corresponding item card partitions with an increased size and an increased centralized location to increase a likelihood of being identified by the user as displayed to the user; and dynamically instructing the display to display the first item card partition that has the increased size and the increased centralized location with the item card as the retailer priority and the purchase priority associated with the item card increases in real-time thereby triggering a change to being spatially positioned in the first item card partition to increase the likelihood of being identified by the user as displayed to the user based on the increased retailer priority and increased purchase priority associated with the item card.

19. The dynamic digital advertising content method of claim 18, further comprising:

dynamically receiving updates to the digital circular as to spatially positioning the item card that has a decreased retailer priority and a decreased purchase priority in a second item card partition that has a decreased size and a decreased centralized location as compared to item card partitions with an increased size and increased centralized location, wherein item cards with a decreased retailer priority and a decreased purchase priority are spatially positioned in corresponding item card partitions with a decreased size and a decreased centralized location to decrease the likelihood of being identified by the user as displayed to the user; and dynamically instructing the display to display the second item card partition that has the decreased size and the decreased centralized location with the item card as the retailer priority and the purchase priority associated with the item card decreased in real-time thereby triggering a change to being spatially positioned in the first item card partition to decrease the likelihood of being identified by the user as displayed to the user based on the decreased retailer priority and decreased purchase priority associated with the item card.

20. The dynamic digital advertising content method of claim 12, further comprising:

receiving a selection from the user that requests an item card to be expanded to display item card details associated with the selected item card not previously viewable in the digital circular initially displayed to the user; and dynamically instructing the display to display an expanded item card detail view that displays the item card details associated with the selected item card not previously viewable in the digital circular initially displayed to the user, wherein the expanded item card detail view replaces the digital circular initially displayed to the user.

* * * * *